US006829206B1

(12) United States Patent
Watanabe

(10) Patent No.: US 6,829,206 B1
(45) Date of Patent: Dec. 7, 2004

(54) INFORMATION RECORDING AND REPRODUCING METHOD AND INFORMATION RECORDING AND REPRODUCING DEVICE

(75) Inventor: Yoshiju Watanabe, Naka (JP)

(73) Assignee: Hitachi, Ltd., Tokyo (JP)

( * ) Notice: Subject to any disclaimer, the term of this patent is extended or adjusted under 35 U.S.C. 154(b) by 725 days.

(21) Appl. No.: 09/641,922

(22) Filed: Aug. 21, 2000

(30) Foreign Application Priority Data

Feb. 18, 2000 (JP) .................................... 2000-046702

(51) Int. Cl.$^7$ ................................................ G11B 5/09
(52) U.S. Cl. .......................... 369/53.35; 369/30.36; 369/47.31; 360/69
(58) Field of Search ........................ 360/69, 75, 71; 369/44.27, 44.28, 44.32, 44.33, 47.31, 47.33, 47.36, 53.15, 53.17, 53.2, 53.23, 53.28, 53.36, 53.1, 53.35, 30.21, 30.22, 30.24, 30.27, 30.36

(56) References Cited

U.S. PATENT DOCUMENTS

| | | | | |
|---|---|---|---|---|
| 5,233,584 A | * | 8/1993 | Kulakowski et al. | 369/44.27 |
| 5,469,546 A | * | 11/1995 | Hosoya | 714/8 |
| 5,721,717 A | * | 2/1998 | Obata et al. | 369/44.27 |
| 5,870,356 A | * | 2/1999 | Ikeda | 369/30.15 |
| 6,519,210 B2 | * | 2/2003 | Ikeda et al. | 369/13.05 |
| 6,587,415 B1 | * | 7/2003 | Imai et al. | 369/53.22 |
| 6,611,392 B1 | * | 8/2003 | Hasebe | 360/53 |
| 6,625,096 B1 | * | 9/2003 | Arai | 369/47.34 |

FOREIGN PATENT DOCUMENTS

JP          8329589        12/1996

OTHER PUBLICATIONS

Japanese Patent Abstract No. 10124262 published 1998.
Japanese Patent Abstract No. 11007706 published 1999.
Japanese Patent Abstract No. 05325434 published 1993.

* cited by examiner

*Primary Examiner*—Thang V. Tran
*Assistant Examiner*—Bach Vuong
(74) *Attorney, Agent, or Firm*—Antonell, Terry, Stout & Kraus, LLP

(57) ABSTRACT

When an error requiring a retry operation has occurred, information concerning the error requiring a retry operation is stored every time. The information includes a sector number (or beginning sector number and number of sectors), the content of the command; a write or read designation, and the number of the times of error occurrence in the sector (or number of the times of retry operation), for example. In case of recording information, like the prior art, information to be written which is stored in a buffer memory is held as it is. Since the information concerning an error requiring a retry operation is stored, even though an error requiring a retry operation occurs repeatedly, a write and/or read operation of the next executable command to another track is executed without immediately switching to the retry operation. Thus, other commands are executed between the occurrence of the error requiring a retry operation and actual execution of the retry operation.

24 Claims, 14 Drawing Sheets

FIG.8

| NO. | Content of processing | Processing time [ms] | Accumlated processing time [ms] |
|---|---|---|---|
| 1 | Processing of sector 15 finished | | 0.0 |
| 2 | Seek to track 5 | 2.0 | 2.0 |
| 3 | Rotational delay time at track 5 | 0.4 | 2.4 |
| 4 | Processing of sector 16, generate 1st retry command | 0.1 | 2.5 |
| 5 | Sort processing of command | 0.2 | 2.7 |
| 6 | Seek to track 4 | 2.0 | 4.7 |
| 7 | Rotational delay time at track 4 | 2.7 | 7.4 |
| 8 | Processing of sector 18 | 0.1 | 7.5 |
| 9 | Seek to track 5 | 2.0 | 9.5 |
| 10 | Rotational delay time at track 5 | 2.9 | 12.4 |
| 11 | 1st retry processing of sector 16, generate retry command | 0.1 | 12.5 |
| 12 | Sort processing of command | 0.2 | 12.7 |
| 13 | Seek to track 4-1 | 2.0 | 14.7 |
| 14 | Rotational delay time at track 4-1 | 2.7 | 17.4 |
| 15 | Processing of sector 18-1 | 0.1 | 17.5 |
| 16 | Seek to track 5 | 2.0 | 19.5 |
| 17 | Rotational delay time at track 5 | 2.9 | 22.4 |
| 18 | 2nd retry processing of sector 16, generate retry command | 0.1 | 22.5 |
| 19 | Sort processing of command | 0.2 | 22.7 |
| 20 | Seek to track 4-2 | 2.0 | 24.7 |
| 21 | Rotational delay time at track 4-2 | 2.7 | 27.4 |
| 22 | Processing of sector 18-2 | 0.1 | 27.5 |
| 23 | Seek to track 5 | 2.0 | 29.5 |
| 24 | Rotational delay time at track 5 | 2.9 | 32.4 |
| 25 | 3rd retry processing of sector 16, generate retry command | 0.1 | 32.5 |
| 26 | Sort processing of command | 0.2 | 32.7 |
| 27 | Seek to track 4-3 | 2.0 | 34.7 |
| 28 | Rotational delay time at track 4-3 | 2.7 | 37.4 |
| 29 | Processing of sector 18-3 | 0.1 | 37.5 |
| 30 | Seek to track 5 | 2.0 | 39.5 |
| 31 | Rotational delay time at track 5 | 2.9 | 42.4 |
| 32 | 4th retry processing of sector 16, generate retry command | 0.1 | 42.5 |
| 33 | Sort processing of command | 0.2 | 42.7 |
| 34 | Seek to track 4-4 | 2.0 | 44.7 |
| 35 | Rotational delay time at track 4-4 | 2.7 | 47.4 |
| 36 | Processing of sector 18-4 | 0.1 | 47.5 |
| 37 | Seek to track 5 | 2.0 | 49.5 |
| 38 | Rotational delay time at track 5 | 2.9 | 52.4 |
| 39 | 5th retry processing of sector 16, generate retry command | 0.1 | 52.5 |
| 40 | Seek to track 4-5 | 2.0 | 54.5 |
| 41 | Rotational delay time at track 4-5 | 2.9 | 57.4 |
| 42 | Processing of sector 18-5 | 0.1 | 57.5 |

FIG.9

| NO. | Content of processing | Processing time [ms] | Accumulated processing time [ms] |
|---|---|---|---|
| 1 | Processing of sector 15 finished |  | 0.0 |
| 2 | Seek to track 5 | 2.0 | 2.0 |
| 3 | Rotational delay time at track 5 | 0.4 | 2.4 |
| 4 | Processing of sector 16 | 0.1 | 2.5 |
| 5 | Rotational delay time at track 5 | 9.9 | 12.4 |
| 6 | 1st retry processing of sector 16 | 0.1 | 12.5 |
| 7 | Rotational delay time at track 5 | 9.9 | 22.4 |
| 8 | 2nd retry processing of sector 16 | 0.1 | 22.5 |
| 9 | Rotational delay time at track 5 | 9.9 | 32.4 |
| 10 | 3rd retry processing of sector 16 | 0.1 | 32.5 |
| 11 | Rotational delay time at track 5 | 9.9 | 42.4 |
| 12 | 4th retry processing of sector 16 | 0.1 | 42.5 |
| 13 | Rotational delay time at track 5 | 9.9 | 52.4 |
| 14 | 5th retry processing of sector 16 | 0.1 | 52.5 |
| 15 | Sort processing of command | 0.8 | 53.3 |
| 16 | Seek to track 4 | 2.0 | 55.3 |
| 17 | Rotational delay time at track 4 | 2.1 | 57.4 |
| 18 | Processing of sector 18 | 0.1 | 57.5 |
| 19 | Seek to track 4-1 | 1.0 | 58.5 |
| 20 | Rotational delay time at track 4-1 | 8.9 | 67.4 |
| 21 | Processing of sector 18-1 | 0.1 | 67.5 |
| 22 | Seek to track 4-2 | 1.0 | 68.5 |
| 23 | Rotational delay time at track 4-2 | 8.9 | 77.4 |
| 24 | Processing of sector 18-2 | 0.1 | 77.5 |
| 25 | Seek to track 4-3 | 1.0 | 78.5 |
| 26 | Rotational delay time at track 4-3 | 8.9 | 87.4 |
| 27 | Processing of sector 18-3 | 0.1 | 87.5 |
| 28 | Seek to track 4-4 | 1.0 | 88.5 |
| 29 | Rotational delay time at track 4-4 | 8.9 | 97.4 |
| 30 | Processing of sector 18-4 | 0.1 | 97.5 |
| 31 | Seek to track 4-5 | 1.0 | 98.5 |
| 32 | Rotational delay time at track 4-5 | 8.9 | 107.4 |
| 33 | Processing of sector 18-5 | 0.1 | 107.5 |

FIG.10

| NO. | Content of processing | Processing time [ms] | Accumulated processing time [ms] |
|---|---|---|---|
| 1 | Processing of sector 15 finished | | 0.0 |
| 2 | Seek to track 5 | 2.0 | 2.0 |
| 3 | Rotational delay time at track 5 | 0.4 | 2.4 |
| 4 | Processing of sector 16 | 0.1 | 2.5 |
| 5 | Sort processing of command | 0.2 | 2.7 |
| 6 | Seek to track 4 | 2.0 | 4.7 |
| 7 | Rotational delay time at track 4 | 2.7 | 7.4 |
| 8 | Processing of sector 18 | 0.1 | 7.5 |
| 9 | Stand by at track 4 | 4.8 | 12.3 |
| 10 | Command receipt processing | 0.2 | 12.5 |
| 11 | Seek to track 4-1 | 1.0 | 13.5 |
| 12 | Rotational delay time at track 4-1 | 3.9 | 17.4 |
| 13 | Processing of sector 18-1 | 0.1 | 17.5 |
| 14 | Stand by at track 4-1 | 4.8 | 22.3 |
| 15 | Command receipt processing | 0.2 | 22.5 |
| 16 | Seek to track 4-2 | 1.0 | 23.5 |
| 17 | Rotational delay time at track 4-2 | 3.9 | 27.4 |
| 18 | Processing of sector 18-2 | 0.1 | 27.5 |
| 19 | Stand by at track 4-2 | 4.8 | 32.3 |
| 20 | Command receipt processing | 0.2 | 32.5 |
| 21 | Seek to track 4-3 | 1.0 | 33.5 |
| 22 | Rotational delay time at track 4-3 | 3.9 | 37.4 |
| 23 | Processing of sector 18-3 | 0.1 | 37.5 |
| 24 | Stand by at track 4-3 | 4.8 | 42.3 |
| 25 | Command receipt processing | 0.2 | 42.5 |
| 26 | Seek to track 4-4 | 1.0 | 43.5 |
| 27 | Rotational delay time at track 4-4 | 3.9 | 47.4 |
| 28 | Processing of sector 18-4 | 0.1 | 47.5 |
| 29 | Stand by at track 4-4 | 4.8 | 52.3 |
| 30 | Command receipt processing | 0.2 | 52.5 |
| 31 | Seek to track 4-5 | 1.0 | 53.5 |
| 32 | Rotational delay time at track 4-5 | 3.9 | 57.4 |
| 33 | Processing of sector 18-5 | 0.1 | 57.5 |

INFORMATION RECORDING AND REPRODUCING METHOD AND INFORMATION RECORDING AND REPRODUCING DEVICE

BACKGROUND OF THE INVENTION

The present invention relates to an information recording and reproducing device having a disk recording medium. Especially, the present invention relates to a method which information can be recorded and reproduced efficiently when an error which requires retrying operation occurs at random access to information, and relates to an information recording and reproducing device which employs the method.

The prior art is explained on a hard disk drive as an example of an information recording and reproducing device which has a disk recording medium.

The hard disk drive is an information recording and reproducing device which records information on the disk magnetic recording medium as magnetization reversals and reproduces information recorded as magnetization reversals by detecting magnetic flux changes.

An access time, in which a recording and reproducing head of the information recording and reproducing device accesses to an arbitrary sector, comprises seek time in which a seek operation is executed, and rotational delay time in which it is waited for the target sector to come under the recording and reproducing head by rotation of the disk medium. It is important to decrease the access time in order to quickly record and reproduce information.

In order to decrease the access time, JP-A-08-329589 discloses method of write or read commands are accumulated and the command queue is sorted to minimize the rotational delay time of the disk when an error requiring retry operation does not occur However, in practice, even though an error occurs in writing or reading information and a retry operation (re-execution of the command) is required, it is important also that idle waiting time required for retry operation is decreased to improve performance of the disk device.

As an another method to decrease the access time, the JP-A-10-124262 discloses a method in which marginal time which is available for retry operation is estimated and retry parameters can be selected according to value of this marginal time if an error requiring retry operation occurs. However, this method is an improved technology of the above described conventional technology example with regard to a setting method of retry parameters. Namely, for example, it becomes possible to select the number of retry times corresponding to the marginal time by this method.

Further, the JP-A-05-325434 discloses a method in which sectors being successive to the error sector are read out and afterward the sector in which an error has occurred is re-read out to decrease the rotational delay time if an error requiring retry operation occurs in a sector at reading out information from two or more sectors in the hard disk drive.

Besides, the JP-A-11-7706 discloses a method in which sectors being successive to the error sector are read out in precedence to decrease processing time if an error requiring retry operation occurs in reading out information from two or more sectors being within one track in an optical disk device.

According to these methods, when an error requiring retry operation occurs, the idle rotational delay time can be decreased by reading out successive sectors in precedence. Namely, these methods disclosed in public known examples are effective at reading out information from two or more successive sectors on a same track.

SUMMARY OF THE INVENTION

However, in the case of random access to information which is characteristics of the information recording and reproducing device using a disk recording medium, namely, in the case of accessing at random to information included in different tracks, these methods cannot be applied.

Besides, in these methods, when information cannot be correctly read out at first retry operation, the retry operation is repeated within restricted time for retry processing. At the repeated retry operation, since processing of the sectors having no error has been finished, only retry operation is executed. Moreover, a process flow in which process control does not execute next command until the restricted time or restricted number of times is exceeded is employed. Therefore, the second or later retry operation requires rotational delay time of about one revolution time at one retry operation as in the conventional process.

In case that information is recorded and reproduced using the disk information recording medium, if an error requiring retry operation occurs, it becomes important to decrease rotational delay time at retry operation in order to decrease the access time. The method, in which marginal time which is available for retry operation is estimated and retry parameters can be selected, is disclosed in the JP-A-10-124262. However, this method does not provide an improved means for occurrence of rotational delay time at retry operation, which is similar to the conventional method. Therefore, in this method, rotational delay time also occurs at retry operation and it cannot be achieved to decrease the rotational delay time.

The methods in which successive sectors are read out in precedence before first retry operation are disclosed in the JP-A-05-325434 and the JP-A11-7706. However, these methods do not provide a effective method to solve the problem for decreasing the rotational delay time in recording and reproducing information in random sectors, especially in case that two or more retry operations are required.

Thus, in recording and reproducing information in random sector on the disk medium, when an error requiring retry operation occurs repeatedly, there is a problem that idle time of about one revolution time in every repetition of the retry operation in the second or after the-second retry operation is brought about and the performance of recording and reproducing the information is deteriorated.

The first method of the present invention is that, when an error requiring retry operation occurs repeatedly, information concerning the error requiring retry operation is stored at every occurrence of the error. This information contains sector number (or beginning sector number and number of sectors), content of command for recording or reproducing, number of the times of error occurrence in the sector (or number of the times of retry operation), for example. In case of recording information, information to be written which is stored in a buffer memory is also held as it is.

Then, by storing the information concerning the error requiring retry operation, when an error requiring retry operation occurs repeatedly, a write or read operation of next executable different command to other track is executed without immediately switching to retry operation.

The second method of the present invention is that an information recording and reproducing device which is provided with a command queue holding write commands or read commands regenerates a command by using the information concerning the error requiring retry operation and the original write/read command to store the information concerning the error requiring retry operation. This command also contains, for example, sector number (or beginning sector number and number of sectors), content of command for recording or reproducing, number of the times of error occurrence in the sector (or number of the times of retry operation).

This new generated command is added to the command queue. After being added to the command queue, the new command is treated as similar as other commands.

Further, the third method of the present invention is that, priority to execute a command is added to the new command generated from the information concerning the error requiring retry operation.

BRIEF DESCRIPTION OF THE DRAWINGS

FIG. 1 is a diagram explaining a structure of a hard disk controller which is an embodiment of the present invention.

FIG. 2 is a diagram explaining a structure of a hard disk controller which is another embodiment of the present invention.

FIG. 3 is an example of a flow chart explaining write/read operation in the present invention including a case of occurrence of error requiring retry operation.

FIG. 4 is a diagram showing placement of sectors on a disk medium to which a command is executed.

FIG. 5 is a diagram showing an example of command execution in the case of FIG. 4 with the elapse of the time.

FIG. 6 is a diagram showing placement of sectors on another disk medium to which a command is executed.

FIG. 7 is a diagram showing an example of command execution in the case of FIG. 6 with the elapse of the time.

[FIG. 8]

FIG. 8 is a diagram showing an example of command execution flow and processing time in the operation executed by the present invention, in which 5 times of retry operation and 5 commands are added to the case of FIG. 6.

[FIG. 9]

FIG. 9 is a diagram showing an example of command execution flow and processing time in the case that an example operation in FIG. 8 is executed by a conventional method.

[FIG. 10]

FIG. 10 is a diagram showing an example of command execution flow and processing time in an operation without retry operation to sector 16 in the example operation in FIG. 8.

FIG. 11 is a diagram showing placement of sectors on a disk medium to which a command is executed in case that two or more times of retry operation are executed to a sector.

FIG. 12 is a diagram showing an example of command execution in the FIG. 11 with the elapse of the time.

FIG. 13 is a diagram showing placement of sectors on a disk medium to which a command is executed in case that two or more times of retry operation are executed to two or more sectors.

FIG. 14 is a diagram showing an example of command execution in the FIG. 13 with the elapse of the time.

FIG. 15 is a diagram explaining a dividing method of a retry command in case that sectors are constituted as a block.

FIG. 16 is a diagram explaining a hard disk drive which is an embodiment of the present invention.

DESCRIPTION OF THE PREFERRED EMBODIMENTS

Figure 1:
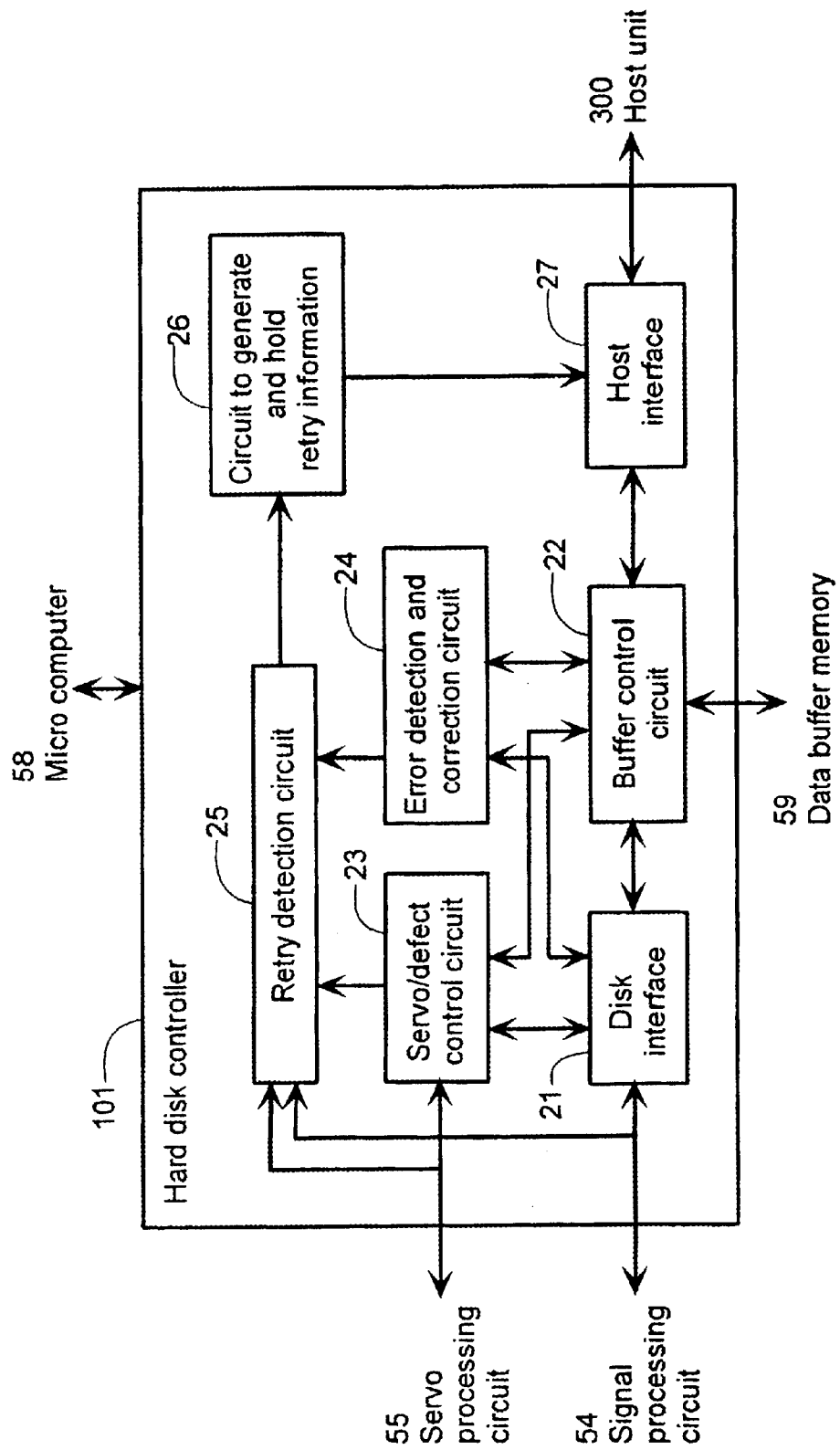
[FIG. 1]
Figure 2:
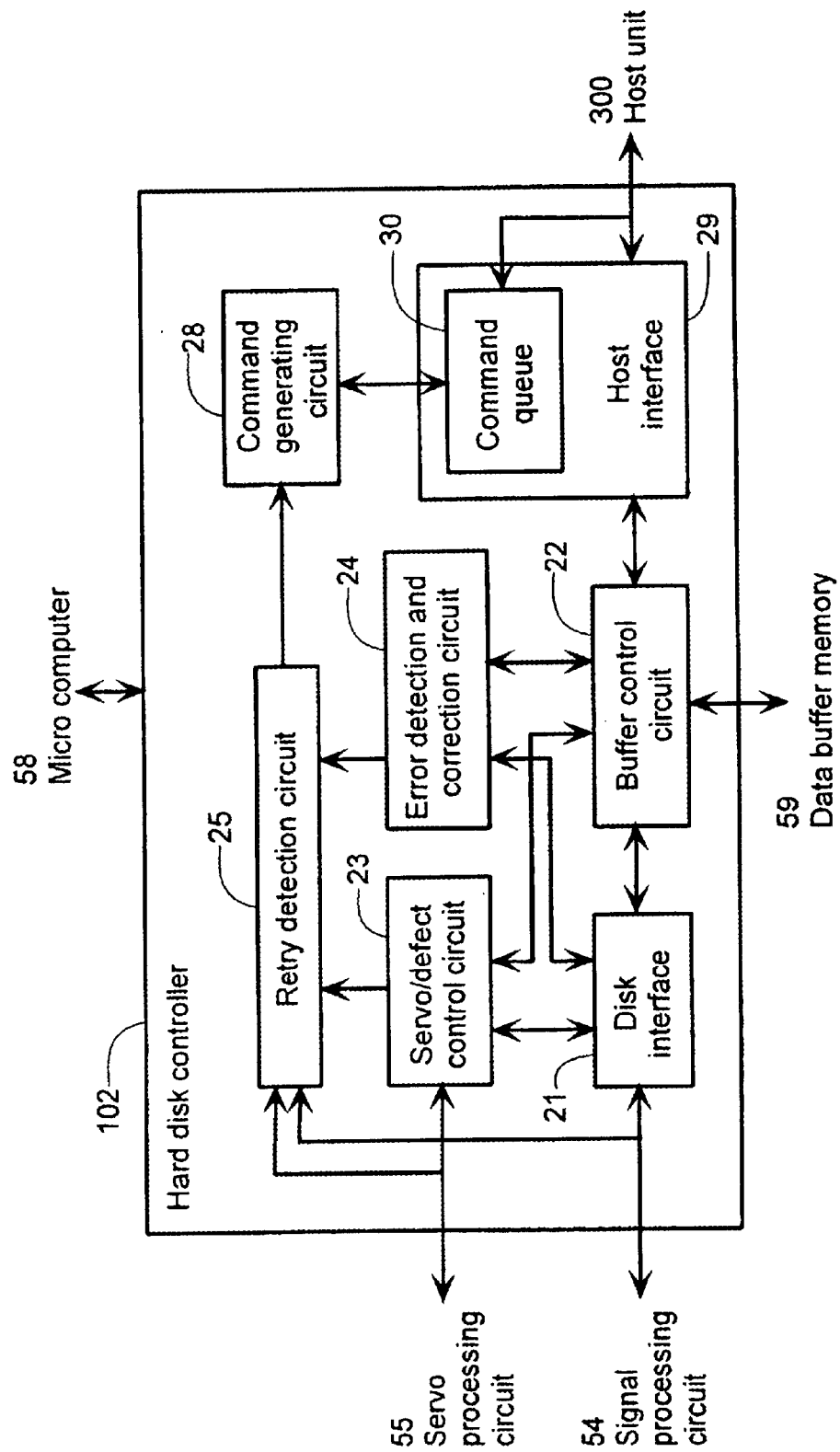
[FIG. 2]
Figure 16:
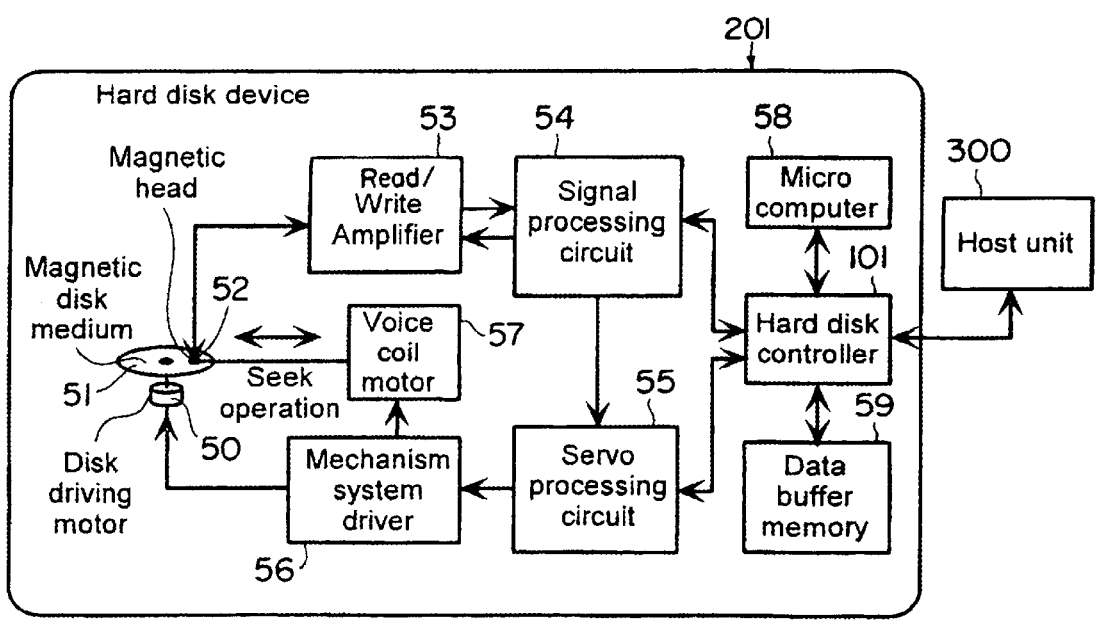
[FIG. 16.]

Hard disk drives which are embodiments of the present invention are described referring to FIG. 1, FIG. 2, and FIG. 16.

FIG. 16 is an example of a constitution of a hard disk drive which is connected to a host unit 300 and executes recording and reproducing information. The hard disk drive 201 comprises a disk driving motor 50, a magnetic disk medium 51 which records information, a magnetic head 52 which records and reproduces information, a read/write amplifier 53 which amplifies and buffers signal, a signal processing circuit 54 which writes and reads information, a servo processing circuit 55 which executes positioning, a mechanism system driver 56 which moves mechanism, a voice coil motor 57 by which head 52 is made to seek, a hard disk controller 101 which controls these components, a micro-computer 58 in which a program that controls the operation of the hard disk controller 101 is executed, and a data buffer memory 59 which stores temporally information to be transferred to and from the host unit 300.

In this device, information is written and read with a definite unit and this unit is called a sector. The sector is placed on an area of concentric circle form on the disk medium which is called a track. Successive two or more sectors on the medium are called a block. The head which writes information on the disk medium and reads information from the disk medium, can do seeking operation in which the head moves nearly along radius direction of the disk medium by an actuator mechanism.

Further, when information is written or read, the disk medium is rotating fast; therefore, the head for recording and reproducing can access to an arbitrary sector on an arbitrary track on the disk medium and can write and read information by the seeking operation and the rotation of the disk medium.

At first, the first hard disk controller which is an embodiment of the present invention is described referring to FIG. 1. The hard disk controller 101 comprises a disk interface 21 which controls input and output of write data or read data to and from the signal processing circuit 54 which processes signal in writing and reading data, a buffer control circuit 22 which controls transmitting and receiving data to and from the data buffer memory 59 which stores temporally write data to the disk medium or read data from the disk medium, a servo/defect control circuit 23 which manages usable area for writing and reading data and controls sectors for writing and reading by controlling timings to process data in a servo portion on Which servo signals for seeking and following operations of the head to write and read data are written, and by controlling so as to process only usable sectors omitting sectors which are registered as defect sectors to avoid defects on the disk medium.

an error detection and correction circuit 24 which generates redundant data at writing data to detect and correct error data, and detects and corrects data error at reading data by using the read data and the redundant data added to detect and correct error data, and a host interface 27 which receives a command for writing or reading data from the host unit 300, and controls receipt or transmission of write data or read data according to the command.

This hard disk controller 101 is connected each other to the above mentioned signal processing circuit 54, the data buffer memory 59, the servo processing circuit 55 which processes servo portion on which servo signals for seek operation and following operation of the head to write and read data is recorded, the micro-computer 58 in which a program that controls the operation of the hard disk controller 101 is executed, and the host unit 300 which issues commands to the hard disk drive to write and read data. The hard disk controller 101 controls the hard disk drive and writes and reads information. Further, the hard disk controller is provided with a retry detection circuit 25 and a circuit to generate and hold retry information 26 that are means for retry processing.

The retry detection circuit 25 inputs signals from various processing circuits such as the disk interface 21, the servo/defect control circuit 23, the error detection and correction circuit 24, the signal processing circuit 54, and the servo processing circuit 55, and detects an occurrence of an error requiring retry operation. Occurrence of uncorrectable error at reading information, variation of write clock at writing information, and occurrence of abnormal operation in various control signals are the factors of occurrence of the error requiring retry operation.

According to the occurrence of the error requiring retry operation detected by the retry detection circuit 25, the circuit to generate and hold retry information 26 generates and holds retry information. The retry information contains content of writing or reading, sector number (or beginning sector number and number of the sectors), and number of the times of retry operation. Further, when a command is generated to write or read the sector in which the error requiring retry operation has occurred, priority information in execution of the command to the sector can be added to the retry information.

The retry information generated from the circuit to generate and hold retry information 26 is sent to the host interface 27, and the host interface 27 executes the retry operation when the retry operation becomes executable corresponding to proper rotational position of the disk. When the error requiring retry operation occurs again at a sector, the circuit to generate and hold retry information generates and holds the retry information again. Requirements for writing or reading from the host unit 300 are executed in order between the occurrence of the error and the execution of the retry operation. The host interface circuit 27 can change the retry method based on the retry information. Further, when writing or reading the sector is to be executed based on the information of the priority order in execution for the sector, the host interface 27 can also decide execution sequence of writing or reading operation according to the priority order.

Thus, the retry information for the sector in which the error requiring retry operation has occurred remains in the circuit to generate and hold retry information 26 until the error is recovered within allowable limits of retry operation, and the retry is executed to the sector. Even in recovering process, the requirement for writing or reading from the host unit 300 is executed at any time if it is executable. During rotational delay time in the retry operation, other requirements for writing and reading are executed; therefore, throughput of the whole disk device to the requirement for writing and reading is improved FIG. 2 shows a constitution of the second hard disk controller which is another embodiment of the present invention.

In a hard disk controller 102 in FIG. 2, the remainder except a command generating circuit 28 and a host interface 29 are common to the controller in FIG. 1. The circuits with same function is presented with same symbol, then, only portion which has different constitution from FIG. 1 is explained. The hard disk controller 102 has the command generating circuit 28 which generates a new command for retry operation according to an occurrence of an error requiring retry operation detected by the retry detecting circuit 25. The new retry command generated by the command generating circuit 28 is sent to the host interface circuit 29 and is stored together in the command queue 30 which accumulates commands from the host unit.

The retry command generated by the command generating circuit 28 contains command content (write or read), sector number (or beginning sector number and number of sectors), and number of the times of retry operation, and the command is made so that it can be judged that the command has been generated by the command generating circuit 28. Further, the command is constituted so that it can be treated in similar way to the write and read command from the host unit 300, and it can be put in the command queue 30.

In the command queue 30, the priority order of execution of the retry command against the write and read command from the host unit 300 can be decided and the retry method can be changed. Additionally, execution order of the write and read command from the host unit 300 can be decided and changed.

As described above, because the write and read command from the host unit 300 and the retry command are put together in the command queue 300, it is possible to execute these commands efficiently. For example, even when a command is given newly from the host unit 300 during execution of the retry command, it is possible to execute the commands including the new command efficiently. In practice, it is always probable that the new write or read commands are sent from the host unit 300, and there is possibility of that these new commands can be also executed during rotational delay time in the retry operation.

Figure 3:
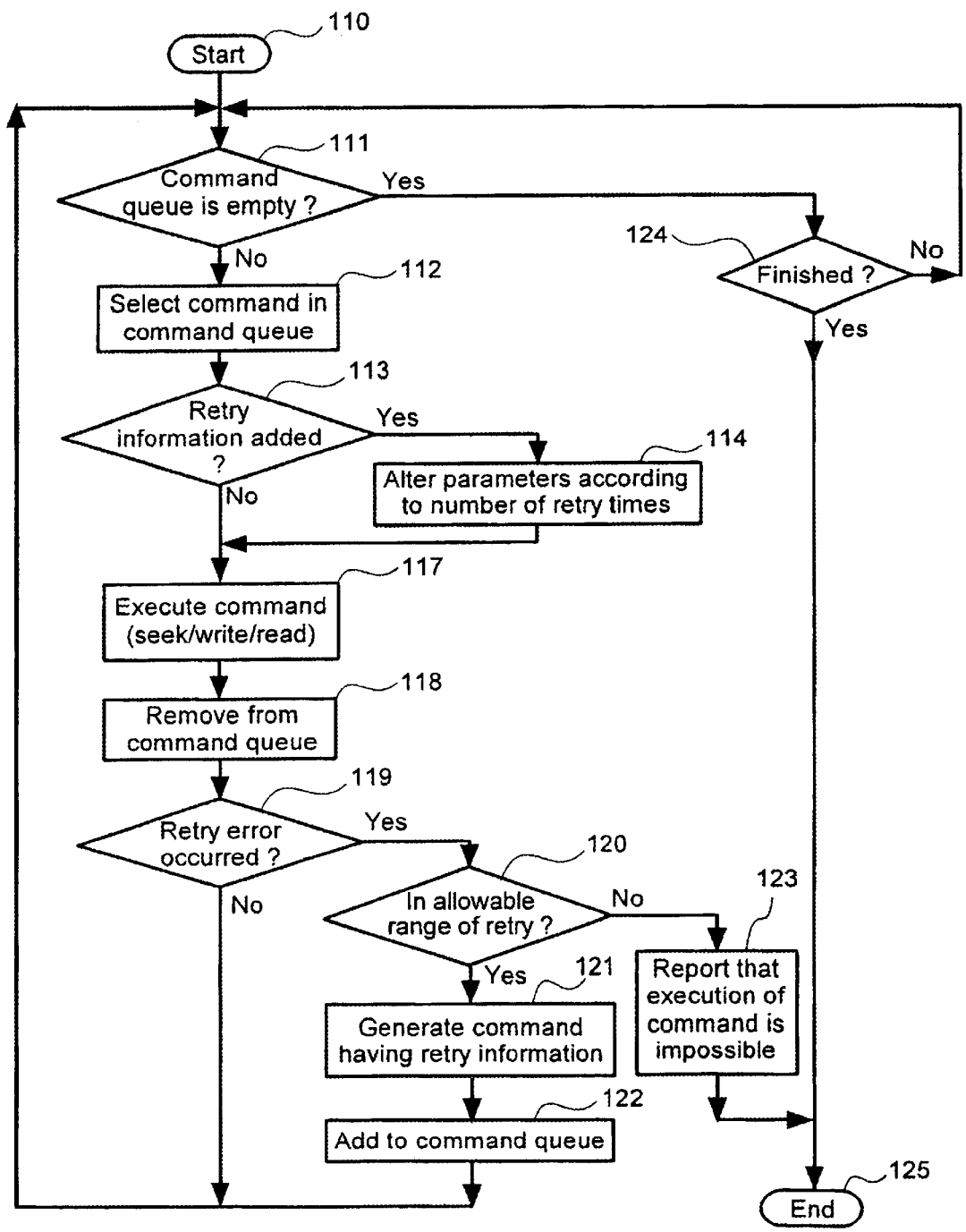
[FIG. 3]

The process procedure of the present invention is explained in detail referring to FIG. 3. FIG. 3 shows an example of a flow chart which explains writing and reading operation according to the present invention which includes the case in which the error requiring retry operation occurs.

At step 110, an operation is started. A test is performed at step 111 to determine if any command exists in the command queue. If any command does not exist in the command queue, it is judged at step 124 if the operation has finished, then the operation ends at step 125, or the control goes back to step 111 and repeats checking the command queue. If any command exists in the command queue at step 111, a command is selected from the command queue at step 112. Selecting the command is executed according to a predetermined selection criterion. At next step 113, a test is performed to determine if the selected command is for retry operation. If it is for retry operation, parameters for retry operation are set at step 114 according to the retry information contained in the command. In order to recover earlier an error requiring retry operation, it is possible that these parameters are changed according to number of retry times.

If the selected command is not for retry operation at step 113, or if the parameters have been set at step 114 the control goes to step 117 and the command is executed. In the execution of the command at step 117, all operations to be necessary for the execution of the command are contained: seek and write/read operation of the magnetic head, setting of parameters to be necessary for these operations and off-track movement (to move the write/read head intentionally from original position) at the retry operation. If the command has been executed at step 117, that command is removed from the command queue at step 118. Then, a test is performed at step 119 to determine if an error requiring retry operation has occurred in the command executed at step 117. If the error requiring retry operation has not occurred, the control goes back to step 111. If the error requiring retry operation has occurred, the control goes to step 120.

A test is performed at step 120 to determine if number of times and operation time of the retry operation to the sector in which the error requiring retry operation has occurred, are within allowable limits. If they are within the allowable limits, a retry command which contains retry information is generated at step 121, and the command is added to the command queue at step 122, then the control goes back to step 111. If they are out of the allowable limits, it is reported at step 123 that execution of the command is impossible, and the operation ends at step 125.

In this example, the step 118, in which the command is removed from the command queue, is placed at this position in FIG. 3 to simplify the flow chart; however, the step 118 may be placed at each branch after step 119 in which occurrence of retry error is examined. Further, the step 119, in which occurrence of an error requiring retry operation is examined, is achieved during the execution of the command at step 117; therefore, it is possible that occurrence of the retry error is watched on a parallel with the execution of the command.

As described above, even though the error requiring retry operation occurs repeatedly, in the method of the present invention, the operation does not enter into a fixed routine as in a conventional method. Therefore, fixed rotational delay time of about one revolution time does not occur at every retry operation, and it is possible that this waiting time is allotted effectively to execution of other command. In other words, the idle time in the rotational delay time is allotted to a useful process execution when the error requiring retry operation occurs repeatedly.

Figure 4:
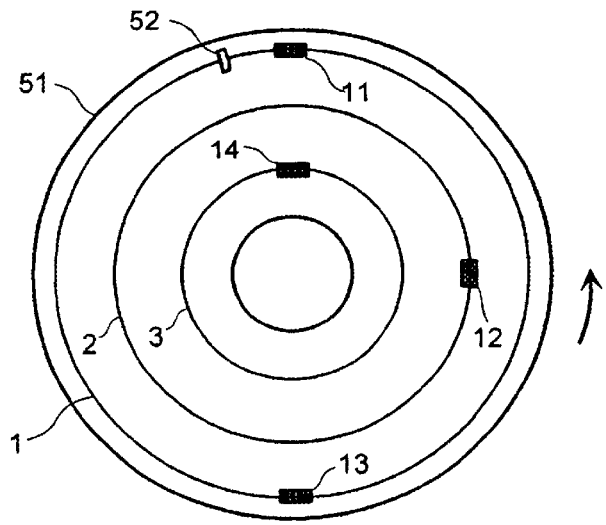
[FIG. 4]
Figure 5:
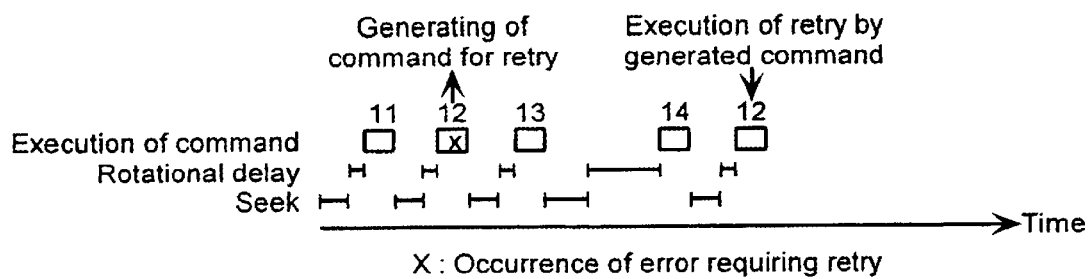
[FIG. 5]
Figure 5:
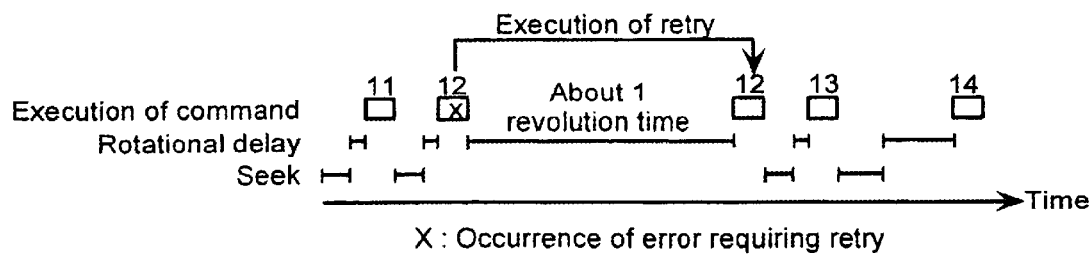

Next, a command execution process in the present invention is explained referring to FIG. 4 and FIG. 5.

FIG. 4 is a diagram showing placement of only tracks and sectors to which the command is executed among two or more tracks having concentric circle form on the disk medium. Tracks 1 to 3 of concentric circle form are on the magnetic disk medium 51 on which information is recorded. Sectors 11 and 13 are on the track 1, sector 12 is on the track 2, and sector 14 is on the track 3. Each sector 11 to 14 is placed at position shown in FIG. 4.

Here, it is assumed that commands (whichever write or read) to sectors 11 to 13 have been accumulated in the command queue 30. First the command to the sector 11 in which an access time of the magnetic head 52 is minimum is selected. In this case, the magnetic head 52 for writing and reading of information has sought to the position shown in the figure, and stays on the track 1. The magnetic disk medium 51 is rotating counterclockwise, the sector 11 comes under the magnetic head 52 after a while. Then, the command to the sector 11 is executed.

Next, the host interface 29 selects the command to the sector 12, in which an access time of the magnetic head 52 is minimum at this time, from the command queue 30. The magnetic head 52 seeks to the track 2, and when the sector 12 comes under the head, the command is executed. Here, it is assumed that an error requiring retry operation has occurred in execution of the command to the sector 12. According to the occurrence of the error, the command generating circuit 28 generates an retry command for first retry operation of the command to the sector 12, removes the original command to the sector 12 from the command queue 30, and adds the generated retry command to the command queue 30.

The host interface 29 selects from the command queue 30 the command to the sector 13 in which an access time of the magnetic head 52 is minimum at this time. At this time, a new command to sector 14 from the host unit has been added to the command queue 30. Here, the magnetic head 52 seeks to the track 1, and waits the sector 13 coming on the track 1. When the sector 13 comes under the magnetic head 52, the command to the sector 13 is executed. (In following description, if no mention is made of an error occurrence at execution of a command, the execution of the command is considered to be finished without any occurrence of error requiring retry operation.)

Further, the host interface 29 selects from the command queue 30 the command to the sector 14 in which an access time of the magnetic head 52 is minimum at this time. The magnetic head 52 seeks to the track 3, and the command is executed. Next, the host interface 29 selects from the command queue 30 the generated retry command to the sector 12 in which an access time of the magnetic head 52 is minimum at this time. Here, parameters for the retry operation are set, and the magnetic head 52 seeks to the track 2. When the sector 12 comes under the head, the command is executed. If commands to the sector 14 and 12 have finished without any error, there is no command in the command queue 30.

FIG. 5 shows an example of the command execution in the case of FIG. 4 with the elapse of time. FIG. 5(a) shows the execution method of the present invention, and FIG. 5(b) shows an example of a conventional method as a comparative example. In FIG. 5, time passes to right direction and a state of time occupied by each operation, namely, execution of commands, rotational delay, seek, is shown.

FIG. 5(a) shows process procedure, in which the command to the sector 11, the command to the sector 12, the command to the sector 13, and the command to the sector 14 are executed in order, and then the command corresponding to retry operation to the sector 12 is executed again. In FIG. 5(b), there is rotational delay of about one revolution time after the command to the sector 11 and the command to the sector 12 are executed, then the retry command to the sector 12 is executed again, and afterward the command to the sector 13 and the command to the sector 14 are executed.

In FIG. 5(b), when the error in the sector 12 is not recovered by one retry operation and several times of retry operation are required, and when a new command is sent from the host unit after the command to the sector 14, the effect of the present invention becomes still larger.

Figure 6:
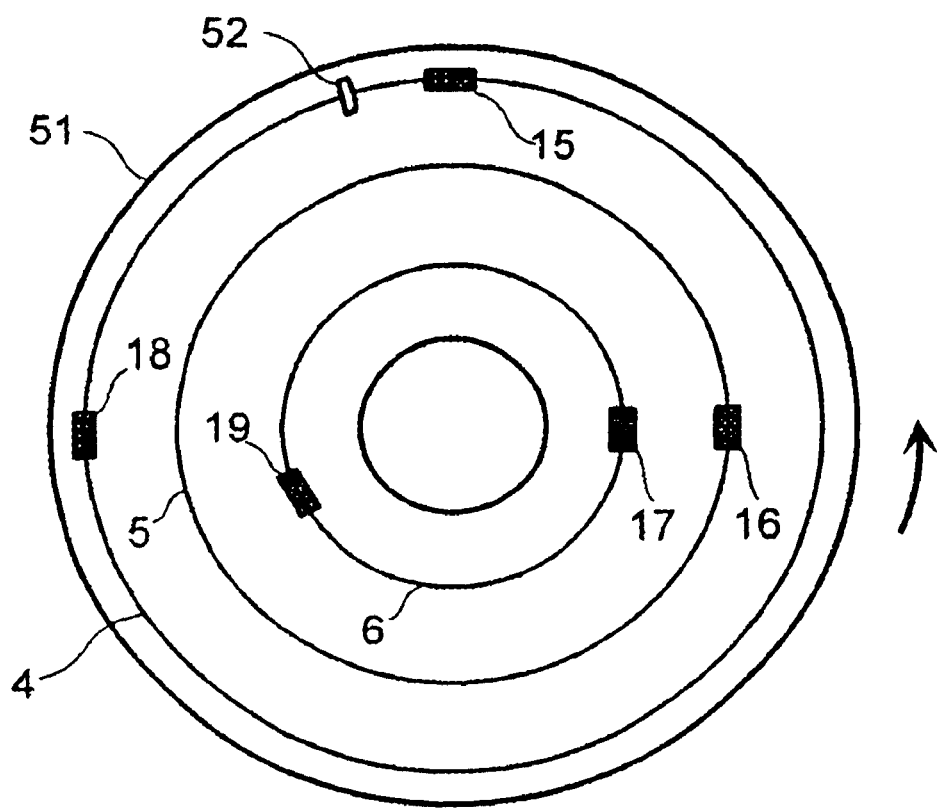
[FIG. 6]
Figure 7:
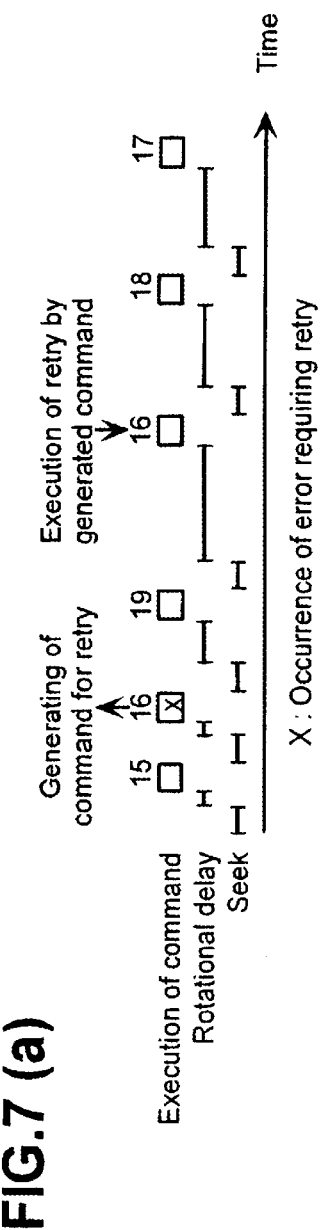
[FIG. 7 ]
Figure 7:
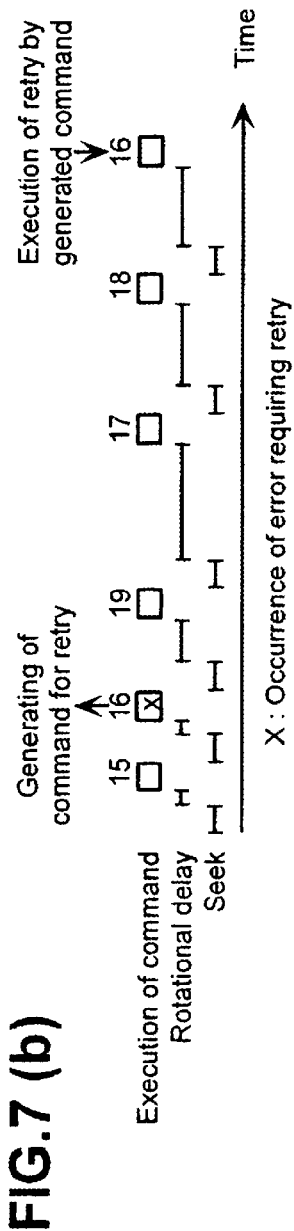
Figure 7:
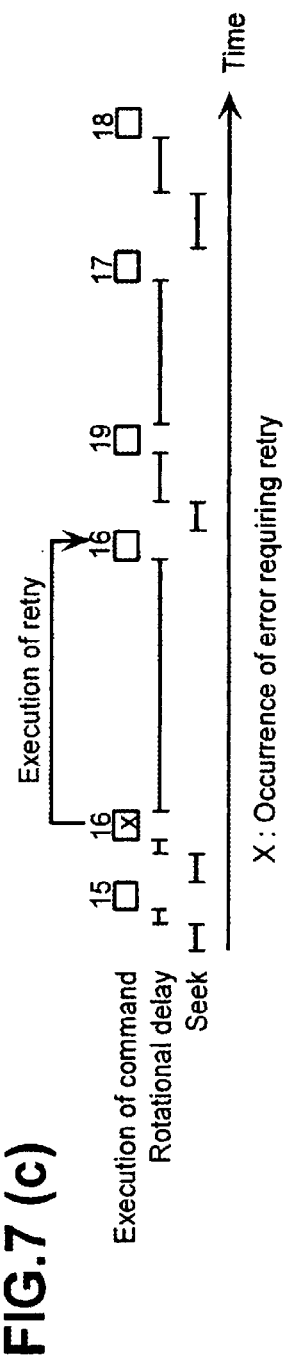

Next, another example of command execution process is explained referring to FIG. 6 and FIG. 7.

FIG. 6 is a diagram, similarly in FIG. 4, showing placement of sectors on the disk medium to which the command is executed. Tracks 4 to 6 having concentric circle form are on the magnetic disk medium 51 on which information is recorded. Sectors 15 and 18 are on the track 4, a sector 16 is on the track 5, and sectors 17 and 19 are on the track 6. Each sector 15 to 19 is placed at position shown in FIG. 6.

Here, it is assumed that commands including a command to the sector 15 are in the command queue 30. First, the host interface 29 selects from the command queue 30 the command to the sector 15 in which an access time of the magnetic head 52 is minimum at this time. The magnetic head 52 seeks to the track 4 and stays on it. The magnetic disk medium 51 is rotating counterclockwise, and when the sector 15 comes under the magnetic head 52 after a while. The command to the sector 15 is executed. The execution of the command to the sector 15 ends normally, and during execution of this command, commands (whichever write or read) to sectors 16 to 19 have been accumulated in the command queue 30.

The host interface 29 selects from the command queue 30 the command to the sector 16 in which an access time of the magnetic head 52 is minimum at this time, and executes the command. Namely, the magnetic head 52 seeks to the track 5, and when the sector 16 comes under the head, the command is executed. Here, an error requiring retry operation has occurred in execution of the command to the sector 16. According to this error occurrence, the command generating circuit 28 generates an retry command for first retry operation of the command to the sector 16, removes the original command to the sector 16 from the command queue 30, and adds the generated retry command to the command queue 30.

At this time, the command corresponding to retry operation to the sector 16 and the commands to the sector 17 to the sector 19 are in the command queue 30. The host interface 29 selects from the command queue 30 the command to the sector 19 as a next command to be executed in which an access time of the magnetic head 52 is minimum.

The magnetic head 52 seeks to the track 6, and when the sector 19 comes under the magnetic head 52 by rotation of the magnetic disk medium 51, the command to the sector 19 is executed. Then, the host interface 29 selects from the command queue 30 a command which is executable next.

The retry command corresponding to retry operation to the sector 16 and the commands to the sectors 17 and 18 are in the command queue 30. The command to the sector 18 is omitted from objects of selection because the access time of the magnetic head 52 from the track 6 having the sector 19 to the track 4 having the sector 18 is larger than rotational delay time of one revolution of the magnetic disk 51 at this time. Candidate for the next operation is remaining two commands that the magnetic head can access to the target sector within rotational delay time of one revolution, namely, the retry command corresponding to retry operation to the sector 16 and the commands to the sector 17. It is problem to select which one of two commands. In such case, in the present invention, the operation order corresponding to conditions can be selected by giving priority to the commands.

First method is a method in which higher priority is given to a command to a sector in which an error requiring retry operation has occurred. In this method, because of giving higher priority to a command to a sector in which an error requiring retry operation has occurred, the retry command corresponding to retry operation to the sector 16 is selected first. The magnetic head 52 seeks to the track 5, and when the sector 16 comes under the magnetic head 52 by rotation of the magnetic disk medium 51, the retry command corresponding to retry operation to the sector 16 is executed. If an error requiring retry operation has occurred again in the execution of the command to the sector 16, the similar processing is executed again.

When the command to the sector 16 has finished without any error, the commands to the sectors 17 and 18 are in the command queue 30, and the command to the sector 18 is selected in which an access time is minimum at this time. The magnetic head 52 seeks to the track 4 and waits for coming of the sector 18 on the track 4. When the sector 18 comes under the magnetic head 52, the command to the sector 18 is executed. Next, the only remainder, the command to the sector 17 is selected. The magnetic head 52 seeks to the track 6, waits for coming of the sector 17 on the track 6, and the command is executed. When the commands to the sectors 18 and 17 have finished without any error, no command is in the command queue 30.

Second method is a method in which lower priority is given to a command to a sector in which an error requiring retry operation has occurred. Continuation of above described selecting one of two commands; the retry command corresponding to retry operation to the sector 16 and the commands to the sector 17, is explained.

In the continuation, candidates of a command to be selected are the retry command corresponding to retry operation to the sector 16 and the command to the sector 17. In the second method, because of giving lower priority to a command to a sector in which an error requiring retry operation has occurred, the command to the sector 17 is selected first. The sector 17 is in the track 6 as same as the sector 19. Therefore, the magnetic head 52 does not seek, stays continuously on the track 6, and when the sector 17 comes under the magnetic head 52 by rotation of the magnetic disk medium 51, the command is executed.

At this time, the retry command corresponding to retry operation to the sector 16 and the command to the sector 18 are in the command queue 30. According to the priority order specified in this method, the command to the sector 18 is selected. The magnetic head 52 seeks to the track 4, and waits for coming of the sector 18 on the track 4 by rotation of the magnetic disk medium 51. When the sector 18 comes under the magnetic head 52, the command to the sector 18 is executed and finishes without error.

Next, the remaining retry command to the sector 16 is selected. The magnetic head 52 seeks to the track 5 stays on the track 5, and waits for coming of the sector 16 by rotation of the magnetic disk medium 51. When the sector 16 comes under the magnetic head 52, the retry command corresponding to the retry operation to the sector 16 is executed. If every command has finished without an error, no command is in the command queue 30.

FIG. 7 shows an example of the command execution in the case of FIG. 6 with the elapse of time as shown in FIG. 5. Every command to be executed is to a different sector on tracks. In FIG. 7, time passes to right direction and a state of time occupied by each operation, namely, execution of the commands, rotational delay, seek, is shown as shown in FIG. 5.

FIG. 7(*a*) shows the time passage in an execution example in which a retry command generated for retry operation has higher priority. As described above in FIG. 6, in the execution example, it is understood that the command to the sector 19 on the another track is executed first after an error requiring retry operation has occurred, and then the retry command to the sector, 16 is executed earlier than the commands to the sectors 17 and 18 according to the above mentioned priority order.

FIG. 7(b) shows the time passage in an execution example in which a retry command generated for retry operation has lower priority. As described above in FIG. 6, it is understood that the commands to the sectors 19, 17, and 18 are executed earlier than the retry command to the sector 16.

If an error requiring retry operation has occurred also in the sector 17, the priority of the retry command to the sector 17 is lowered because it is the criterion in the selection in this case that lower priority is given at the time of error occurrence. The retry command to the sector 16 is selected earlier. Further, it is possible that another criterion in selection is set and applied.

FIG. 7(c) shows time passage in a conventional method, in which if an error occurs in execution of the command to the sector 16, continuously the retry operation is executed repeatedly, and another command is not executed till this retry operation finishes. In this method, it is understood that the process time in which all commands to the sectors 17 to 19 have finished is longer than the process time in the case of FIG. 7(a) and FIG. 7(b).

An example in which an error is recovered by one time of retry operation is described above. In the case that many times of retry operations are necessary to recover the error, there is also a method in which priority order is changed depending on a state of retry operation. For example, priority of a retry command is lowered at beginning, then when the number of times of retry operation or processing time exceeds an appointed value, higher priority is given to the retry command.

The result of evaluation for the case that many times of retry operation are necessary to recover the error is explained in more detail referring to FIG. 8 to FIG. 10. Basic placement of the sectors on the disk medium to which the commands are executed is as same as placement in FIG. 6. However, five sectors 18-1, 18-2, 18-3, 18-4, and 18-5 (not shown in the drawing) are placed in outer circumferential area neighboring the sector 18. The track corresponding to each sector is track 4-1, 4-2, 4-3, 4-4, and 4-5 (not shown in the drawing) respectively. In this placement, it is assumed that five times of retry operations are executed to the sector 16, and five commands to the above mentioned sectors in the outer circumferential area neighboring the sector 18 are issued in the above mentioned sector order at every revolution of the disk medium. Further, it is assumed that all the while, no command is issued to the sector 17 or sector 19.

The disk is rotating at 6000 revolution per minute. Accordingly, 1 revolution time is 10 [ms], ¼ revolution time from the sector 15 to the sector 16 is 2.5 [ms], and ½ revolution time from the sector 16 to the sector 18, or to the sectors 18-1 to 18-5 is 5 [ms]. It is evaluated that processing time for each sector, which includes time of execution of writing or reading, judging whether retry operation is required or not, and generating a retry command, is 0.1 [ms]. It is evaluated that access time between the track 5 and one of tracks 4 and 4-1 to 4-5 is 2 [ms], and access time between two tracks among the tracks 4 and 4-1 to 4-5 is 1 [ms]. Sorting time of commands is evaluated as 0.2 to 0.8 [ms] according to number of the times of sorting. Receipt processing time of a command is evaluated as 0.2 [ms]and is described only when the receipt processing time is necessary explicitly.

FIG. 8 is a diagram showing an example of command execution flow and processing time in the case that five times of retry operation are executed in the above described embodiment. Here, during the magnetic disk medium rotates five times (i.e. from item No. 4 which is first command execution to the sector 16 to item No. 39 which is the fifth retry operation), five times of retry operations have been executed and the error has been recovered. Further, execution of commands to the five sectors in neighboring outer circumferential area of the sector 18, namely to the sectors 18-1 to 18-5 (i.e. items No. 15, No. 22, No. 29, No. 36 and No. 42) have finished. In this embodiment by the present invention, processing time required from the beginning of processing of the sector 16 (item No. 4) to the end of processing of the sector 18-5 (item No. 42) is 55.1 [ms].

FIG. 9 is a diagram showing a comparative example of command execution flow and processing time in the case that the execution example of FIG. 8 is executed by a conventional method. Here, processing of the sector 16 and the retry processing to the sector 16 (items No. 4 to No. 14) are executed first, and then the command to the sector 18 and the commands: to the sectors 18-1 to 18-5 received during the execution of the retry processing are executed (item No. 15 to No. 33). Therefore, it takes 5 revolutions in the retry operation and 5 revolutions in the subsequent commands execution. That is, it takes the sum of 10 revolutions. In the conventional method, processing time required from the beginning of processing of the sector 16 (item No. 4) to the end of processing of the sector 18-5 (item No. 42) is 105.1 [ms]. Namely, in the comparative example by a conventional method, twice the processing time is required in comparison with 55.1 [ms] in the embodiment of the present invention.

An example in which the effect of the present invention is shown from another point of view is explained referring to FIG. 10 in comparison with FIG. 8. FIG. 10 is a diagram showing a command execution flow and processing time in the case without the retry operation to the sector 16 in the embodiment of FIG. 8. It is the same as the example of FIG. 8 except no retry operation to the sector 16. It is understood from FIG. 10 that processing time required from the beginning of processing of the sector 16 (item No. 4) to the end of processing of the sector 18-5 (item No. 33) is 55.1 [ms]. This processing time is the same as the processing time in the example of FIG. 8. It can be said that, "the rotational delay time required by retry operation is allocated effectively to other command processing, and idle rotational delay time is eliminated" by the retry processing method shown in FIG. 8 as an example of the present invention.

As described above, the present invention gives larger effect when an error is not recovered by one time of command retry, several times of retry operations are necessary, and when a new command is transferred always from the host unit.

Figure 11:
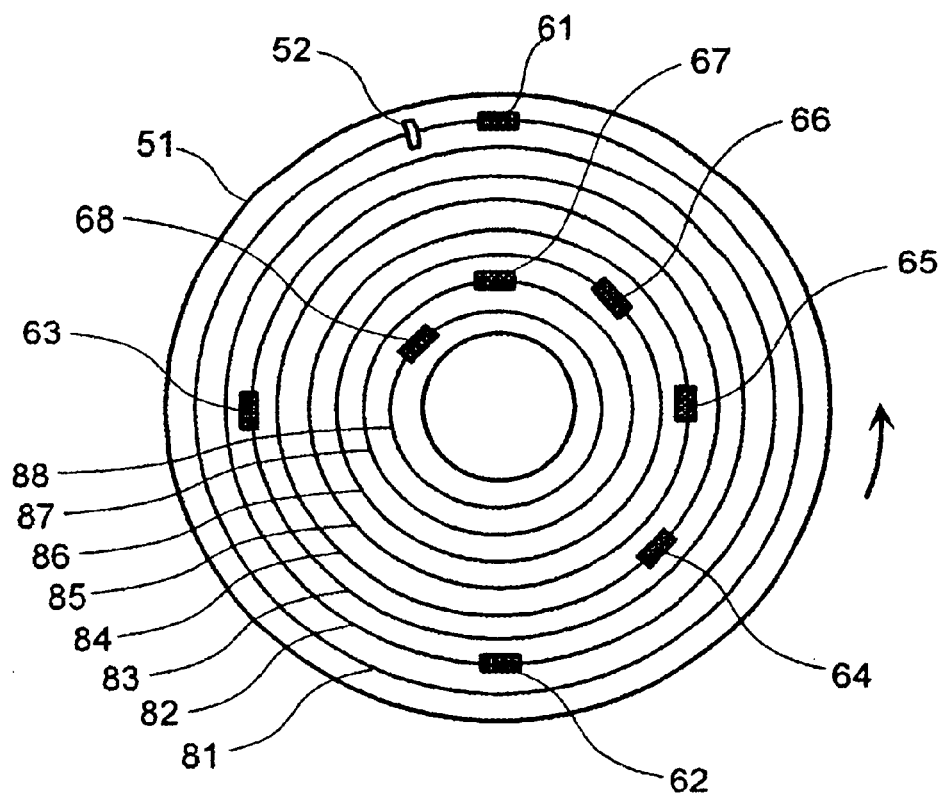
[FIG. 11]
Figure 12:
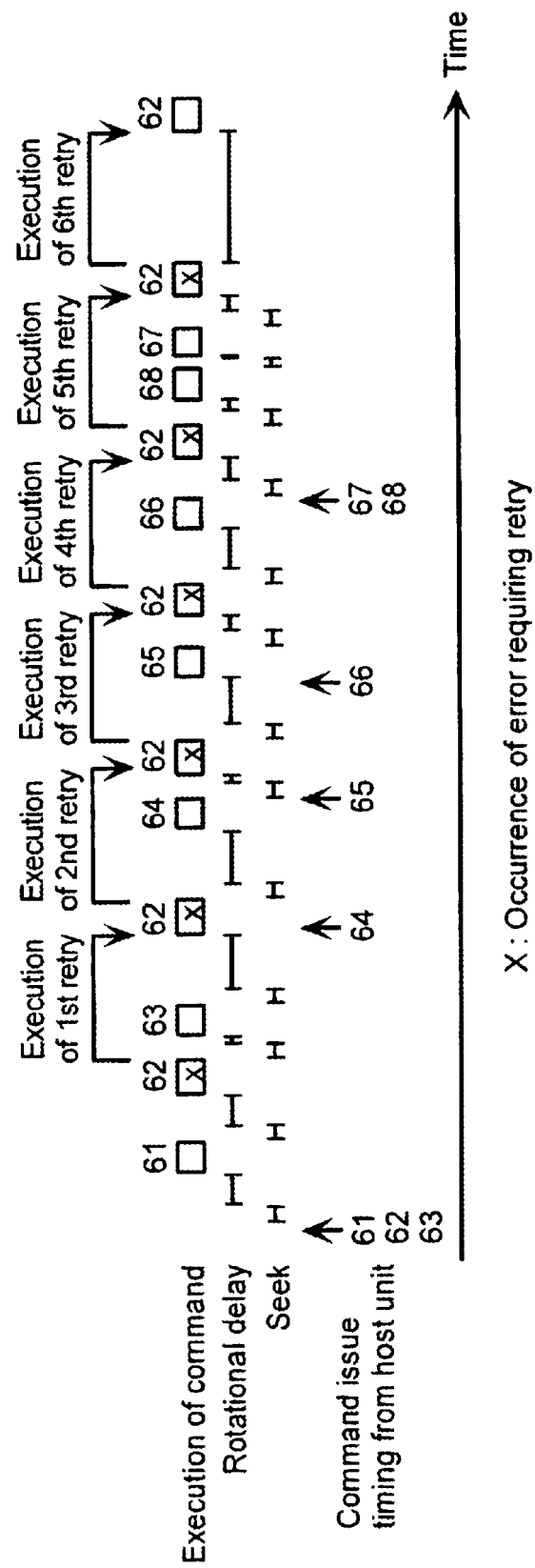
[FIG. 12]

Next, an operation in which two or more times of retry operations are executed to a sector is explained referring to FIG. 11 and FIG. 12.

FIG. 11 is a diagram showing placement of only tracks and sectors to which a command is executed among two or more tracks having concentric circle form on the disk medium similarly to FIG. 4. Tracks 81 to 88 of concentric circle form are on the magnetic disk medium 51 on which information is recorded. Further, sectors 61, 62, 63, 64, 65, 66, 67, and 68 are on the tracks 81, 82, 83, 84, 85, 86, 87, and 88 respectively. Each sector 61 to 68 is placed at position shown in FIG. 11. Here, it is assumed that commands (whichever write or read) to the sector 61 to sector 63 have been accumulated in the command queue 30.

The host interface 29 selects from the command queue 30 the command to the sector 61 in which an access time of the magnetic head 52 is minimum at this time. Then, the magnetic head 52 for writing and reading information seeks to the position shown in the drawing, and stays on the track 81. The magnetic disk medium 51 is rotating counterclockwise; therefore, the sector 61 comes under the magnetic head 52 after a while. Then, the command to the sector 61 is executed.

Next, the host interface 29 selects from the command queue 30 the command to the sector 62 in which an access time of the magnetic head 52 is minimum at this time. The magnetic head 52 seeks to the track 82, and when the sector 62 comes under the magnetic head, the command is executed. Here, it is assumed that an error requiring retry operation has occurred. According to the occurrence of the error, the command generating circuit 28 generates a retry command for the first retry operation of the command to the sector 62, removes the original command to the sector 62 from the command queue 30, and adds the generated retry command to the command queue 30.

At this time, the command to the sector 63 and the command for the first retry operation to the sector 62 are In the command queue 30. Here, the host interface 29 selects from the command queue 30 the command to the sector 63 in which an access time of the magnetic head 52 is minimum at this time. Then, the magnetic head 52 seeks to the track 83, and waits for coming of the sector 63 on the track 83. When the sector 63 comes under the magnetic head 52, the command to the sector 63 is executed.

Next, the host interface 29 selects from the command queue 30 the retry command for the first retry operation to the sector 62 in which an access time of the magnetic head 52 is minimum at this time. The magnetic head 52 seeks to the track 82 according to the parameters set for first retry operation, and waits for coming of the sector 62 on the track 82. When the, sector 62 comes under the head, the first retry command to the sector 62 is executed. At this time, it is assumed that an error requiring retry operation has occurred again.

According to the occurrence of the error, the command generating circuit 28 generates a retry command for the second retry operation of the command to the sector 62, removes the first retry command to the sector 62 from the command queue 30, and adds the anew generated second retry command to the command queue 30.

At this time, it is assumed that a new command to the sector 64 has been added to the command queue 30 from the host unit 300. In this stage, the command to the sector 64 and the second retry command to the sector 62 are in the command queue. The host interface 29 selects from the command queue 30 the command to the sector 64 in which an access time of the magnetic head 52 is minimum at this time. The magnetic head 52 seeks to the track 84, and, waits for coming of the sector 64 on the track 84. When the sector 64 comes under the magnetic head 52, the command to the sector 64 is executed.

At this time, it is assumed that a new command to the sector 65 has been added to the command queue 30 from the host unit 300. In this stage, the command to the sector 65 and the second retry command to the sector 62 are in the command queue. The host interface 29 selects from the command queue 30 the second retry command to the sector 62 in which an access time of the magnetic head 52 is minimum at this time. The magnetic head 52 seeks to the track 82 according to the parameters set for the second retry operation, and waits for coming of the sector 62 on the track 82. When the sector 62 comes under the magnetic head 52, the second retry command to the sector 62 is executed.

At this time, it is assumed that an error requiring retry operation has occurred again. According to the occurrence of the error, the command generating circuit 28 generates a retry command for the third retry operation of the command to the sector 62, removes the second retry command to the sector 62 from the command queue 30, and adds the anew generated third retry command to the command queue 30.

At this time, the command to the sector 65 and the third retry command to the sector 62 are in the command queue 30. The host interface 29 selects from the command queue 30 the command to the sector 65 in which an access time of the magnetic head 52 is minimum at this time. Then, the magnetic head 52 seeks to the track 85. When the sector 65 comes: under the magnetic head 52, the command to the sector 65 is executed.

At this time, it is assumed that a new command to the sector 66 has been added to the command queue 30 from the host unit 300. Accordingly, the command to the sector 66 and the third retry command to the sector 62 are in the command queue. The host interface 29 selects from the command queue 30 the third retry command to the sector 62 in which an access time of the magnetic head 52 is minimum at this time. The magnetic head 52 seeks to the track 82 according to the parameters set for the third retry operation, and waits for coming of the sector 62. When the sector 62 comes under the magnetic head 52, the third retry command to the sector 62 is executed.

At this time, it is assumed that an error requiring retry operation has occurred again.

According to the occurrence of the error, the command generating circuit 28 generates a retry command for the fourth retry operation of the command to the sector 62, removes the third retry command to the sector 62 from the command queue 30, and adds the anew generated fourth retry command to the command queue 30.

At this time, the command to the sector 66 and the fourth retry command to the sector 62 are in the command queue 30. The host interface 29 selects from the command queue 30 the command to the sector 66 in which an access time of the magnetic head 52 is minimum at this time. Then, the magnetic head 52 seeks to the track 86, and waits for coming of the sector 66 on the track 86. When the sector 66 comes under the magnetic head 52, the command to the sector 66 is executed.

At this time, it is assumed that new commands to the sector 67 and sector 68 have been added to the command queue 30 from the host unit 300. Accordingly, the command to the sector 67, the command to the sector 68, and the forth retry command to the sector 62 are in the command queue. The host interface 29 selects from the command queue 30 the fourth retry command to the sector 62 in which an access time of the magnetic head 52 is minimum at this time. The magnetic head 52 seeks to the track 82 according to the parameters set for the fourth retry operation. When the sector 62 comes under the magnetic head 52, the fourth retry command to the sector 62 is executed.

At this time, it is assumed that an error requiring retry operation has occurred again. According to the occurrence of the error, the command generating circuit 28 generates a retry command for the fifth retry operation of the command to the sector 62, removes the fourth retry command to the sector 62 from the command queue 30, and adds the anew generated fifth retry command to the command queue 30.

At this time, the command to the sector 67, the command to the sector 68, and the fifth retry command to the sector 62 are in the command queue 30. The host interface 29 selects from the command queue 30 the command to the sector 68 in which an access time of the magnetic head 52 is minimum at this time. Then, the magnetic head 52 seeks to the track 88. When the sector 68 comes under the magnetic head 52, the command to the sector 68 is executed and the execution finishes with no error.

At this time, the command to the sector 67 and the fifth retry command to the sector 62 are in the command queue 30. The host interface 29 selects from the command queue 30 the command to the sector 67 in which an access time of the magnetic head 52 is minimum at this time. Then, the magnetic head 52 seeks to the track 87, and waits for coming of the sector 67 on the track 87. When the sector 67 comes under the magnetic head 52, the command to the sector 67 is executed.

At this time, only the fifth retry command to the sector 62 is in the command queue 30. The host interface 29 selects this command from the command queue 30. Then, the magnetic head 52 seeks to the track 82 according to the parameters set for the fifth retry operation, and when the sector 62 comes under the magnetic head 52, the fifth retry command to the sector 62 is executed.

At this time, it is assumed that an error requiring retry operation has occurred again. According to the occurrence of the error, the command generating circuit 28 generates a retry command for the sixth retry operation of the command to the sector 62, removes the fifth retry command to the sector 62 from the command queue 30, and adds the anew generated sixth retry command to the command queue 30.

At this time, only the sixth retry command to the sector 62 is in the command queue 30. The host interface 29 selects this command from the command queue 30. Then, the magnetic head 52 stays on the track 82 according to the parameters set for the sixth retry operation, and waits for coming of the sector 62 on the track 82. When the sector 62 comes under the magnetic head 52, the sixth retry command to the sector 62 is executed.

As described above, even though there is a sector which requires two or more times of retry operations, commands to other sectors can be executed by utilizing time between executions of each retry operation. In this case, the command to the sector in which an error requiring retry operation does not occur can be executed with little influence by the retry operation of the command to the sector in which an error requiring retry operation has occurred, and the retry operation of the command to the sector in which an error requiring retry operation has occurred can be executed with little influence by the execution of the command to the sector in which an error requiring retry operation does not occur.

FIG. 12 shows an execution example of the commands explained referring to FIG. 11 with the elapse of time. In FIG. 12, time passes to right direction and a state of time occupied by each operation, namely, execution of the commands, rotational delay, seek, is shown. Further, command issued timings from the host unit are shown.

FIG. 12 shows the processing procedure in which the commands, from the command to the sector 61 to the command to the sector 68, are executed. It is understood that the commands to the other sectors, sector 63 to sector 68, are executed between executions of the retry command to the sector 62. It is allowed that two or more commands are executed between the executions of retry operation such as the commands to the sectors 67 and 68, if it is judged to be executable.

Further, in the example of FIG. 11 and FIG. 12, if the number of times of retry operation is limited to five times, the command generating circuit 28 does not generate the sixth retry command and the execution of the retry command is brought to the end at five times.

Figure 13:
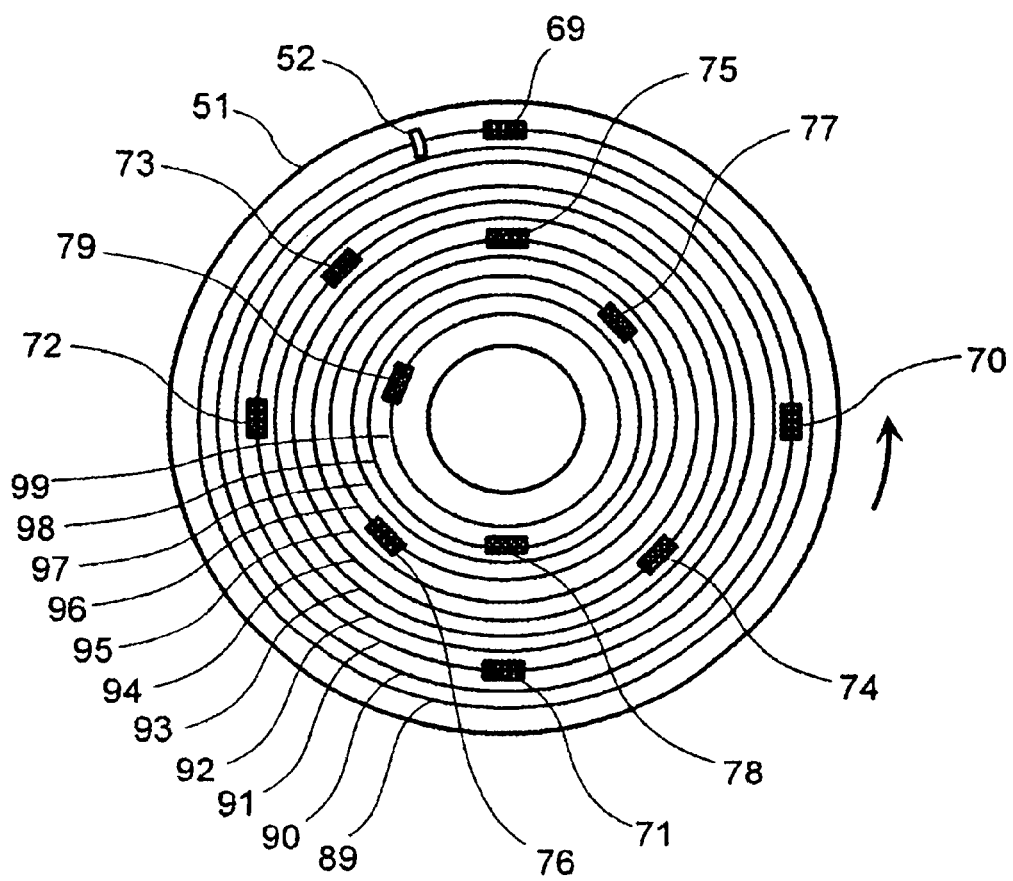
[FIG. 13]
Figure 14:
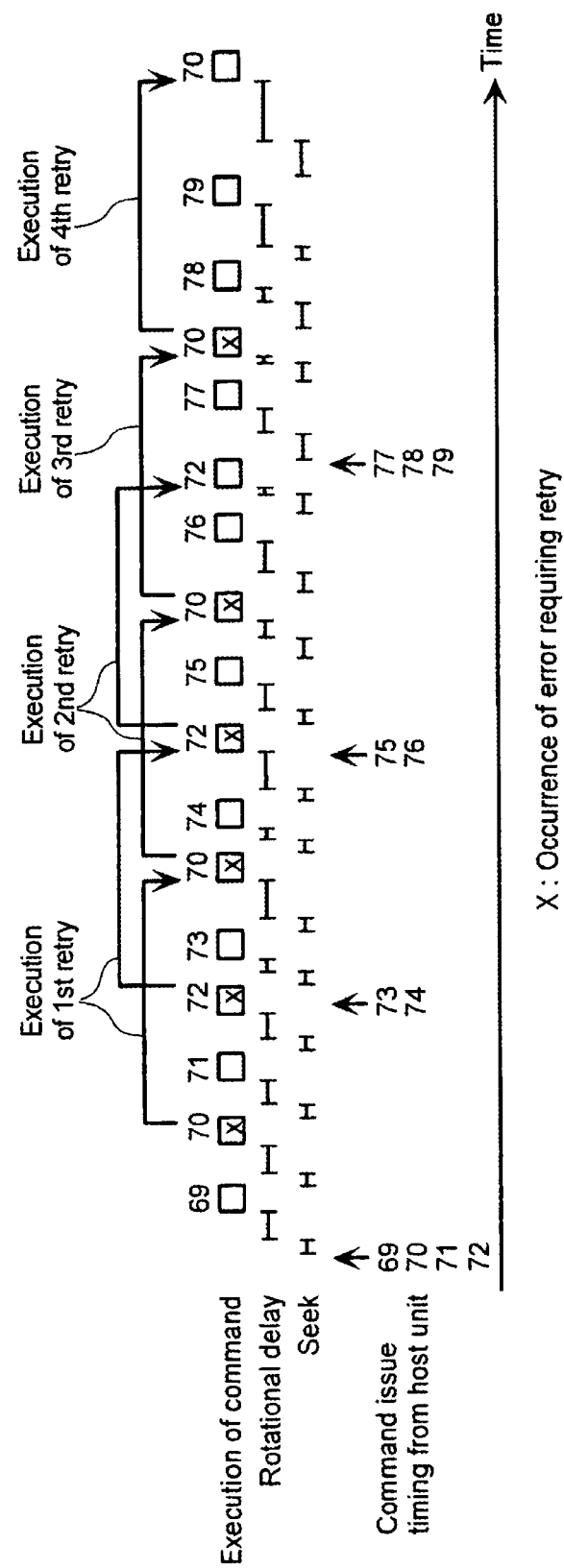
[FIG. 14]

Next, an operation in the case that two errors requiring retry operations have occurred in different tracks is explained referring to FIG. 13 and FIG. 14.

FIG. 13 is a diagram showing placement of only tracks and sectors to which a command is executed among two or more tracks having concentric circle form on the disk medium similarly in FIG. 4. Tracks 89 to 99 of concentric circle form are on the magnetic disk medium 51 on which information is recorded. Further, sectors 69, 70, 71, 72, 73, 74, 75, 76, 77, 78, and 79 are on the tracks 89, 90, 91, 92, 93, 94, 95, 96, 97, 98, and 99 respectively. Each sector 69 to 79 is placed at position shown in FIG. 13.

At this time, commands (whichever write or read) to the sector 69 to sector 72 have been accumulated in the command queue 30. First, the host interface 29 selects the command to the sector 69 in which an access time of the magnetic head 52 is minimum at this time. Then, the magnetic head 52 for writing and reading of information seeks to the position shown in the drawing, and stays on the track 89. The magnetic disk medium 51 is rotating counterclockwise; therefore, the sector 69 comes under the magnetic head 52 after a while. Then, the command to the sector 69 is executed.

Next, the host interface 29 selects from the command queue 30 the command to the sector 70 in which an access time of the magnetic head 52 is minimum at this time. The magnetic head 52 seeks to the track 90, and when the sector 70 comes under the magnetic.: head 52, the command is executed. Here, it is assumed that an error requiring retry operation has occurred in the execution of the command to the sector 70. The command generating circuit 28 generates a retry command for the first retry operation of the command to the sector 70, removes the original command to the sector 70 from the command queue 30, and adds the generated retry command to the command queue 30.

At this time, the command to the sector 71, the command to the sector 72, and the command for the first retry operation to the sector 70 are in the command queue. The host interface 29 selects from the command queue 30 the command to the sector 71 in which an access time of the magnetic head 52 is minimum at this time. Then, the magnetic head 52 seeks to the track 91, and waits for coming of the sector 71 on the track 91. When the sector 71 comes under the magnetic head 52, the command to the sector 71 is executed.

At this time, the command to the sector 72 and the command for the first retry operation to the sector 70 are in the command queue. The host interface 29 selects from the command queue 30 the command to the sector 72 in which an access time of the magnetic head 52 is minimum at this time. The magnetic head 52 seeks to the track 92, and when the sector 72 comes under the magnetic head 52, the command to the sector 72 is executed. Here, it is assumed that an error requiring retry operation has occurred in the execution of the command to the sector 72. The command generating circuit 28 generates a retry command for the first retry operation of the command to the sector 72, removes the original command to the sector 72 from the command queue 30, and adds the generated retry command to the command queue 30.

At this time, it is assumed that new commands to the sector 73 and sector 74 are added to the command queue 30 from the host unit 300. Accordingly, the command to the sector 73, the command to the sector 74, the command for the first retry operation to the sector 70, and-the command for the first retry operation to the sector 72 are in the command queue 30. The host interface 29 selects from the command queue 30 the command to the sector 73 in which an access time of the magnetic head 52 is minimum at this time. Then, the magnetic head 52 seeks to the track 93, and waits for coming of the sector 73 on the track 93. When the sector 73 comes under the magnetic head 52, the command to the sector 73 is executed.

At this time, the command to the sector 74, the command for the first retry operation to the sector 70, and the command for the first retry operation to the sector 72 are in the command queue 30. The host interface 29 selects from the command queue 30 the first retry command,- to the sector 70 in which an access time of the magnetic head 52 is minimum at this time. Then, according to the parameters set for the first retry operation, the magnetic head 52 seeks to the track 90, and waits for coming of the sector 70 on the track 90. When the sector 70 comes under the magnetic head 52, the first retry command to the sector 70 is executed.

At this time, it is assumed that an error requiring retry operation has occurred again. The command generating circuit 28 generates a retry command for the second retry operation of the command to the sector 70, removes the first retry command to the sector 70 from the command queue 30, and adds the anew generated second retry command to the command queue 30.

At this time, the command to the sector 74, the command for the second retry operation to the sector 70, and the first retry command to the sector 72 are in the command queue 30. The host interface 29 selects from the command queue 30 the command to the sector 74 in which an access time of the magnetic head 52 is minimum at this time. Then, the magnetic head 52 seeks to the track 94, and when the sector 74 comes under the magnetic head 52, the command to the sector 74 is executed.

At this time, the command for the second retry operation to the sector 70 and the command for the first retry operation to the sector 72 are in the command queue 30. The host interface 29 selects from the command queue 30 the first retry command to the sector 72 in which an access time of the magnetic head 52 is minimum at this time. Then, the magnetic head 52 seeks to the track 92 according to the parameters set for the first retry operation, and when the sector 72 comes under the magnetic head 52, the first retry command to the sector 72 is executed.

At this time, it is assumed that an error requiring retry operation has occurred again. The command generating circuit 28 generates a retry command for the second retry operation of the command to the sector 72, removes the first retry command to the sector 72 from the command queue 30, and adds the anew generated second retry command to the command queue 30. This process flow is based on the flow shown in FIG. 3 that step 118 in which the command is removed from the command queue is performed at each branch after step 119 in which occurrence of an error requiring retry operation is examined. When a retry operation is required, generating a command, adding the command to the command queue, and removing the original command are performed by the command generating circuit 28.

At this time, it is assumed that new commands to the sector 75 and sector 76 are added to the command queue 30 from the host unit 300. Accordingly, the command to the sector 75, the command to the sector 76, the command for the second retry operation to the sector 70, and the command for the second retry operation to the sector 72 are in the command queue 30. The host interface 29 selects the command to the sector 75 as the next executable command from the command queue 30. Then, the magnetic head 52 seeks to the track 95, and waits for coming of the sector 75 on the track 95. When the sector 75 comes under the magnetic head 52, the command to the sector 75 is executed.

At this time, the command to the sector 76, the command for the second retry operation to the sector 70, and the command for the second retry operation to the sector 72 are in the command queue 30. The host interface 29 selects from the command queue 30 the second retry command to the sector 70 in which an access time of the magnetic head 52 is minimum at this time. Then, the magnetic head 52 seeks to the track 90 according to the parameters set for the second retry operation, and when the sector 70 comes under the magnetic head 52, the second retry command to the sector 70 is executed.

At this time, it is assumed that an error requiring retry operation has occurred again. The command generating circuit 28 generates a retry command for the third retry operation of the command to the sector 70, removes the second retry command to the sector 70 from the command queue 30, and adds the anew generated third retry command to the command queue 30.

At this time, the command to the sector 76, the command for the third retry operation to the sector 70, and the command for the second retry operation to the sector 72 are in the command queue 30. The host interface 29 selects from the command queue 30 the command to the sector 76 in which an access time of the magnetic head 52 is minimum at this time. The magnetic head 52 seeks to the track 96, and waits for the sector 76 on the track 96. When the sector 76 comes under the magnetic head 52, the command to the sector 76 is executed.

At this time, the command for the third retry operation to the sector 70 and the command for the second retry operation to the sector 72 are in the command queue 30. The host interface 29 selects from the command queue 30 the second retry command to the sector 72 in which an access time of the magnetic head 52 is minimum at this time. Then, the magnetic head 52 seeks to the track 92 according to the parameters set for the second retry operation, and waits for coming of the sector 72 on the track 92. When the sector 72 comes under the magnetic head 52, the second retry command to the sector 72 is executed.

At this time, it is assumed that new commands to the sector 77, sector 78, and sector 79 are added to the command queue 30 from the host unit 300. Accordingly, the command to the sector 77, the command to the sector 78, the command to the sector 79, and the command for the third retry operation to the sector 70 are in the command queue 30. The host interface 29 selects from the command queue 30 the command to the sector 77 in which an access time of the magnetic head 52 is minimum at this time. Then, the magnetic head 52 seeks to the track 97, and waits for coming of the sector 77 on the track 97. When the sector 77 comes under the magnetic head 52, the command to the sector 77 is executed.

At this time, the command to the sector 78, the command to the sector 79, and the command for the third retry operation to the sector 70 are in the command queue 30. The host interface 29 selects from the command queue 30 the third retry command to the sector 70 in which an access time of the magnetic head 52 is minimum at this time. Then, the magnetic head 52 seeks to the track 90 according to the parameters set for the third retry operation, and when the sector 70 comes under the magnetic head 52, the third retry command to the sector 70 is executed.

At this time, it is assumed that an error requiring retry operation has occurred again. The command generating circuit 28 generates a retry command for the fourth retry operation of the command to the sector 70, removes the third retry command to the sector 70 from the command queue 30, and adds the anew generated fourth retry command to the command queue 30.

At this time, the command to the sector 78, the command to the sector 79, and the command for the fourth retry operation to the sector 70 are in the command queue 30. The host interface 29 selects from the command queue 30 the command to the sector 78 in which an access time of the magnetic head 52 is minimum at this time. Then, the magnetic head 52 seeks to the track 98, and waits for coming of the sector 78 on the track 98. When the sector 78 comes under the magnetic head 52, the command to the sector 78 is executed.

At this time, the command to the sector 79 and the command for the fourth retry operation to the sector 70 are in the command queue 30. The host interface 29 selects from the command queue 30 the command to the sector 79 in which an access time of the magnetic head 52 is minimum at this time. Then, the magnetic head 52 seeks to the track 99. When the sector 79 comes under the magnetic head 52, the command to the sector 79 is executed.

At this time, the command for the fourth retry operation to the sector 70 is in the command queue 30. The host interface 29 selects the only remaining fourth retry command to the sector 70 from the command queue 30. Then, the magnetic head 52 seeks to the track 90 according to the parameters set for the fourth retry operation, and when the sector 70 comes under the, magnetic head 52, the fourth retry command to the sector 70 is executed.

As described above, even though two or more retry operations to two or more sectors are required, the operation is executable. Moreover, because each retry information is held in each retry command, it is possible to execute the retry operation using parameters corresponding to each retry operation.

FIG. 14 shows an execution example of the commands explained referring to FIG. 13 with the elapse of time. In FIG. 14, time passes to right direction and a state of time occupied by each operation namely, execution of the commands, rotational delay, seek, is shown. Further, command issued timings from the host unit are shown.

FIG. 14 shows the processing procedure in which the commands, from the command to the sector 69 to the command to the sector 79, are executed. It is understood that the commands to the other sectors, sector 71 to sector 79, are executed between executions of the retry commands to the sector 70 and sector 72. It is also possible that two or more commands are executed between the executions of retry operation. Furthermore, it is also possible that two or more retry commands are generated.

The preferred embodiment explains as if new commands from the host unit 300 were added after execution of each command. However, in practice, the commands may be added at any timing, and the host interface 29 operates to select a command to be executed at every time when a command is added from the host unit 300.

Figure 15:
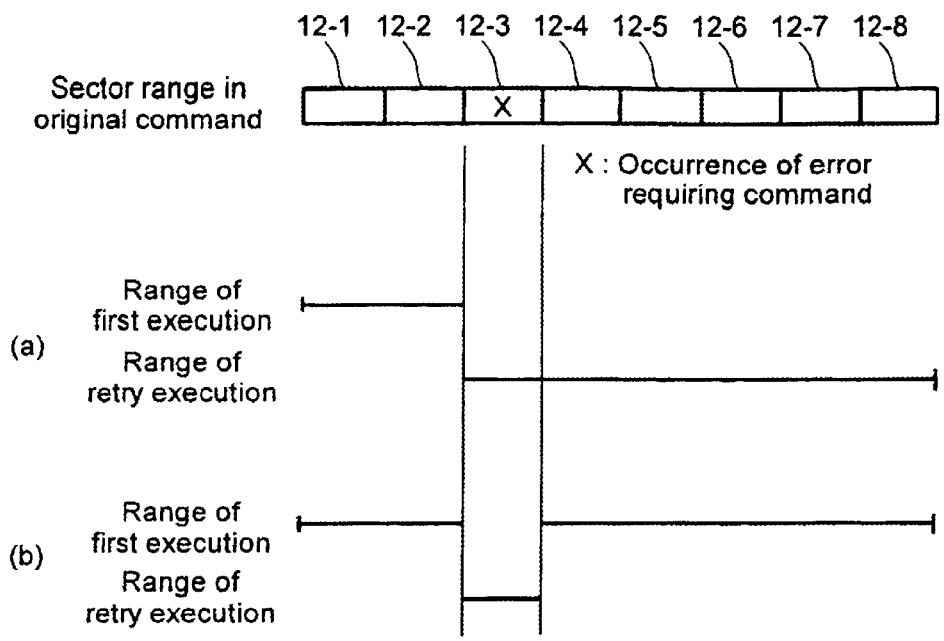
[FIG. 15]

FIG. 15 explains division of a retry command in the case that the sector 12 shown in FIG. 4 is not a sector but is constituted as a block comprising successive two or more sectors. In this case, the block comprises eight sectors, sector 12-1 to sector 12-8, and it is assumed that an error requiring retry operation has occurred in the sector 12-3. In this case, two kinds of methods for generating retry command, (a), (b) are considered.

In method (a), sectors after the error sector 12-3 are treated as a group, a retry command is generated for the sector 12-3 to sector 12-8, and the retry operation is executed. In method (b), the original command is executed to sectors after the error sector 12-3, a retry command is generated only for the error sector 12-3, and the retry operation is executed. Even in this case, basic unit of recording and reproducing information is a sector, and this case is an example in which, by treating partially together the sectors as a group, the retry operation is executed.

Besides FIGS. 15(a), (b), there is another method in which, for retry operation, the block comprising sectors from 12-1 to 12-8 is not divided, a retry command is generated for the sector 12-1 to sector 12-8, and the retry operation is executed. Even in this case, basic unit of recording and reproducing information is a sector, and this case is an example in which, by treating together the two or more basic units as a block, the retry operation is executed.

As described above, the hard disk drive 201 of the present invention records and reproduces information with a sector unit, and receives commands to record or reproduce information from the host unit 300. The command received from the host unit 300 is executed, and if an error requiring retry operation has occurred, the hard disk controller 100 makes anew a command for retry operation. Whether retry operation has occurred or not, new commands are sent from the host unit 300. It is possible that the other commands are executed between executions of retry command by treating these commands and the retry command equally.

Namely, although a command to record or reproduce information is sent from the host unit 300 to the hard disk drive 201, a same command is executed in two or more times to a same sector, and other commands to record or reproduce information are executed while execution of the command is being waited. In execution of the other commands to record or reproduce information, it is possible that the execution accompanies seeking of the magnetic head 52 in which the head moves to an other track (or cylinder), and head change in which the present head is switched to another head on another surface of the magnetic disk medium.

As the hard disk controller 100, by using the hard disk controller 101 (FIG. 1) or 102 (FIG. 2) in the above described embodiment of the present invention, or by using a hard disk controller having an another constitution of the present invention in which priority to execute the command is added to the retry command generated when an error requiring retry operation has occurred, a hard disk drive, in which deterioration of time performance to access to target information is decreased as a whole, can be obtained, even if an error requiring retry operation occurs.

In the embodiment described above, the state of one surface of the magnetic disk medium 51 is described. However, the present invention is similarly applicable to a hard disk drive having two or more disk surfaces (two or more magnetic heads 52 are also necessary).

In the embodiment, a command from the host unit is explained as a command of which subject is one sector; however, the present invention is applicable to a command having subject of successive two or more sectors easily by dividing the command on two or more sectors in front and behind at a sector in which an error requiring retry operation has occurred.

Further, retry information (the number of times of retry, for example) is added to the command which is generated and added according to the occurrence of the error requiring retry operation. Therefore, it is also possible that, parameters for recording and reproducing at the retry operation is changed based on that retry information, and performance of recording and reproducing at the retry operation is improved.

The present method is :used easily in combination with a conventional command queue sorting technology (for example, a method disclosed in the JP-A-08-329589, in which the command queue is sorted when an error requiring retry operation has not occurred).

To execute two commands of which one is a command to a sector in which an error requiring retry operation has occurred, and another is a command to a sector which is a neighbor sector in radius direction of the error sector, processing time of more than one revolution time is necessary. The order of the access to the commands depends on the algorithm for sorting the command queue. In this case, various situations are supposed.

For example, it is supposed that the sector in which the error requiring retry operation has occurred is desired to be recovered as soon as possible by accessing every time. Conversely, it is supposed that, based on a consideration that some recovering time is required for the sector in which the error requiring retry operation has occurred, higher priority is given to a command which has not be executed, namely a command to a sector in which an error requiring retry operation has not occurred. Further, it is possible that low priority is given at beginning, priority is raised increasingly according to time from the occurrence of the error requiring retry operation, and when it takes long from the occurrence of the error requiring retry operation, the command is executed at every revolution to finish the retry operation within an appointed time.

By giving priority to the both commands together; the retry command generated according to the occurrence of the error requiring retry operation and the other command sent from the host unit, and by updating the priority, the present invention can correspond to the situation described above easily, and can decide an efficient execution order in the retry operation.

Additionally, the information concerning the error requiring retry operation is stored and access to the other sector is made possible between the occurrence of the error and the next recording or reproducing, so that the idle time can be decreased and the access time of whole recording and reproducing information system can be shortened.

Furthermore, performance of recording and reproducing can be improved by changing the parameters for recording and reproducing at the recording and reproducing information from the sector in which the error requiring retry operation has occurred according to the stored information concerning the error requiring retry operation. Therefore, even though an error requiring retry operation has occurred, performance of recording and reproducing information can be improved in the information recording and reproducing device having disk recording medium.

The above explanation of, the present invention has explained in detail an example of the hard disk drive. However, the present invention is applicable to an information recording and reproducing device having disk recording medium in general.

What is claimed is:

1. An information recording and reproducing method comprising the steps of:
generating recording or reproducing commands to sectors of a disk recording medium on which information is to be recorded or from which information is to be reproduced;
generating and holding information for a retry operation when error has occurred in the process of execution of a command; and
executing a recording or reproducing command in another sector between the occurrence of said error and execution of said retry operation.

2. The information recording and reproducing method as claimed in claim 1, further comprising to the step of:
changing a retry method of recording or reproducing information according to said information for a retry operation or the contend of a regenerated command queue in which commands are stored.

3. The information recording and reproducing method as claimed in claim 2, wherein when said information for a retry operation to a sector where an error has occurred is generated, priority information for execution of a command is added, which priority information determines an execution order of said recording and reproducing commands.

4. The information recording and reproducing method as claimed in claim 1, wherein when said information for a retry operation to a sector where an error has occurred is generated, a priority information for execution of a command is added, which priority information determines an execution order of said recording and reproducing commands.

5. An information recording and reproducing method comprising the steps of:
generating recording or reproducing commands to sectors of a disk recording medium on which information is to be recorded or from which information is to be reproduced;
accumulating said commands a command queue;
executing commands held in said command queue in a sequence determined by a predetermined rule;
regenerating a command for which an error occurs during execution and deleting the corresponding original command from the command queue, when an error requiring a retry operation has occurred; and
adding the regenerated command to the command queue.

6. The information recording and reproducing method as claimed in claim 5, further comprising to the step of:
changing a retry method according to said regenerated command or the content of said regenerated command queue.

7. The information recording and reproducing method as claimed in claim 6, wherein when said information is generated, a priority information on execution of the command is added to the regenerated command, which priority information is used in the determination of the execution order of command in said command queue.

8. The information recording and reproducing method as claimed in claim 5, wherein when said information is generated, a priority information on execution of the command is added to the regenerated command, which priority information is used in the determination of the execution order of command in said command queue.

9. An information recording and reproducing device, comprising:
a rotatable recording medium having sectors in which information is recorded or reproduced;
a motor for rotating said recording medium;
a head for recording information on said recording medium or reproducing information from said recording medium;
an actuator for moving said head to a position on said recording medium to effect recording or reproducing;
a servo processing circuit for executing a positioning operation to position said head to access a sector of said recording medium;

a signal processing circuit for generating a signal commanding recording or reproducing of information;

a retry detection circuit for detecting occurrence of an error during recording or reproducing of information;

a command generating circuit for generating commands for recording or reproducing information on sectors of said information medium and for generating a retry command for a retry operation in response to detection of an error by said retry detection circuit; and a command execution control circuit for executing a command for recording or reproducing information to a sector between the occurrence of an error in another sector and the execution of a retry operation on the other sector.

10. The information recording and reproducing device as claimed in claim 9, wherein said command execution control circuit includes command queue in which commands are held.

11. The information recording and reproducing device as claimed in claim 10, wherein said command execution control circuit adds priority information to a retry command for execution of a retry operation to a sector where an error has occurred to determine an execution order of commands.

12. The information recording and reproducing device as claimed in claim 9, wherein said command execution control circuit adds priority information to a retry command for execution of a retry operation to a sector where an error has occurred to determine an execution order of commands.

13. An information recording and reproducing device, comprising:

a rotatable recording medium having sectors in which information is recorded or reproduced;

a motor for rotating said recording medium;

a head for recording information on said recording medium or reproducing information from said recording medium;

an actuator for moving said head to a position on said recording medium to effect recording or reproducing;

a servo processing circuit for executing a positioning operation to position said head to access a sector of said recording medium;

a signal processing circuit for generating a signal commanding recording or reproducing of information;

a retry detection circuit for detecting occurrence of an error during recording or reproducing of information;

a command generating circuit for generating a retry command for a retry operation in response to detection of an error by said retry detection circuit;

a command holding circuit for queuing commands from a host unit and retry command for a retry operation; and a command execution control circuit for sorting the commands in said command holding circuit according to a predetermined rule.

14. The information recording and reproducing device as claimed in claim 13, wherein said command execution control circuit changes a retry method according to said information on a retry operation or the content of said command holding circuit.

15. The information recording and reproducing device as claimed in claim 14, wherein said command execution control circuit adds priority information to a retry command for execution of a retry operation to a sector where an error has occurred to determine an execution order of commands.

16. The information recording and reproducing device as claimed in claim 13, wherein said command execution control circuit adds priority information to a retry command for execution of a retry operation to a sector where an error has occurred to determine an execution order of commands.

17. A system comprising:

an information recording and reproducing device including:

a rotatable recording medium having sectors in which information is recorded or reproduced;

a motor for rotating said recording medium;

a head for recording information on said recording medium or reproducing information from said recording medium;

an actuator for moving said head to a position on said recording medium to effect recording or reproducing;

a servo processing circuit for executing a positioning operation to position said head to access a sector of said recording medium;

a signal processing circuit for generating a signal commanding recording or reproducing of information;

a retry detection circuit for detecting occurrence of an error during recording or reproducing of information;

a command generating circuit for generating commands for recording or reproducing information on sectors of said information medium and for generating a retry command for a retry operation in response to detection of an error by said retry detection circuit; and a command execution control circuit for executing a command for recording or reproducing information to a sector between the occurrence of an error in another sector and the execution of a retry operation on the other sector; and a host unit linked to the information recording and reproducing device, to receive/provide the information from/to the information recording and reproducing device.

18. The system as claimed in claim 17, wherein said command execution control circuit includes command queue in which commands are held.

19. The system as claimed in claim 18, wherein said command execution control circuit adds priority information to a retry command for execution of a retry operation to a sector where an error has occurred to determine an execution order of commands.

20. The system as claimed in claim 17, wherein said command execution control circuit adds priority information to a retry command for execution of a retry operation to a sector where an error has occurred to determine an execution order of commands.

21. A system comprising:

an information recording and reproducing device including:

a rotatable recording medium having sectors in which information is recorded or reproduced;

a motor for rotating said recording medium;

a head for recording information on said recording medium or reproducing information from said recording medium;

an actuator for moving said head to a position on said recording medium to effect recording or reproducing;

a servo processing circuit for executing a positioning operation to position said head to access a sector of said recording medium;

a signal processing;circuit for generating a signal commanding recording or reproducing of information;

a retry detection circuit for detecting occurrence of an error during recording or reproducing of information;

a command generating circuit for generating a retry command for a retry operation in response to detection of an error by said retry detection circuit;

a command holding circuit for queuing commands from a host unit and retry command for a retry operation; and a command execution control circuit for sorting the commands in said command holding circuit according to a predetermined rule; and a host unit linked to the information recording and reproducing device, to receive/provide the information from/to the information recording and reproducing device.

22. The system as claimed in claim 21, wherein said command execution control circuit changes a retry method according to said information on a retry operation or the content of said command holding circuit.

23. The system as claimed in claim 22, wherein said command execution control circuit adds priority information to a retry command for execution of a retry operation to a sector where an error has occurred to determine an execution order of commands.

24. The system as claimed in claim 21, wherein said command execution control circuit adds priority information to a retry command for execution of a retry operation to a sector where an error has occurred to determine an execution order of commands.

* * * * *